(12) United States Patent
Sun et al.

(10) Patent No.: US 10,555,170 B2
(45) Date of Patent: Feb. 4, 2020

(54) METHOD AND APPARATUS FOR AUTHENTICATION OF WIRELESS DEVICES

(71) Applicants: Sheng Sun, Kanata (CA); Yan Xin, Kanata (CA)

(72) Inventors: Sheng Sun, Kanata (CA); Yan Xin, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/056,078

(22) Filed: Feb. 29, 2016

(65) Prior Publication Data

US 2017/0070881 A1 Mar. 9, 2017

Related U.S. Application Data

(60) Provisional application No. 62/220,828, filed on Sep. 18, 2015, provisional application No. 62/214,370, filed on Sep. 4, 2015.

(51) Int. Cl.
*H04W 12/06* (2009.01)
*H04L 29/06* (2006.01)
*H04W 12/04* (2009.01)

(52) U.S. Cl.
CPC ......... *H04W 12/06* (2013.01); *H04L 63/0492* (2013.01); *H04L 63/06* (2013.01);
(Continued)

(58) Field of Classification Search
CPC ........... G06F 21/30; G06F 21/44; H04L 9/006
(Continued)

(56) References Cited

U.S. PATENT DOCUMENTS 6,931,574 B1 * 8/2005 Coupal ................. H04L 43/18
709/230
8,909,941 B1 * 12/2014 Trimberger ............. G06F 21/64
713/190
(Continued)

FOREIGN PATENT DOCUMENTS

CN 101820629 A 9/2010
CN 103988480 A 8/2014
(Continued)

OTHER PUBLICATIONS

English abstract of CN101820629A.
(Continued)

*Primary Examiner* — Lynn D Feild
*Assistant Examiner* — Viral S Lakhia

(57) ABSTRACT

A method and apparatus for authenticating a directional multi gigabit device for communication in an IEEE 802.11-compliant wireless network are provided. Network association and authentication can be performed in parallel, with association and authentication information elements included in common frames. Authentication information elements are included in at least one and potentially a sequence of management frames transmitted between an access point of the wireless network and the device. The authentication information elements are thereby exchanged between the access point and the device. The exchanged authentication information elements are used to establish that both the access point and the device possess a common cryptographic key. The exchanged management frames can also facilitate network association. Authentication information elements can also be included in non-management frames. A format for the authentication information elements is presented.

22 Claims, 17 Drawing Sheets

(52) U.S. Cl.
CPC ............ *H04L 63/061* (2013.01); *H04L 63/08* (2013.01); *H04W 12/04* (2013.01)

(58) Field of Classification Search
USPC .................. 375/267; 455/411; 713/190–193
See application file for complete search history.

(56) References Cited

U.S. PATENT DOCUMENTS

| | | | |
|---|---|---|---|
| 10,237,818 B2* | 3/2019 | Grandhi | ................ H04W 48/16 |
| 2005/0032506 A1 | 2/2005 | Walker | |
| 2006/0067526 A1 | 3/2006 | Faccin et al. | |
| 2007/0206537 A1* | 9/2007 | Cam-Winget | ........ H04L 63/162 |
| | | | 370/331 |
| 2008/0065884 A1 | 3/2008 | Emeott et al. | |
| 2009/0052461 A1* | 2/2009 | Brown | ................ H04L 12/4625 |
| | | | 370/401 |
| 2009/0217043 A1 | 8/2009 | Metke et al. | |
| 2012/0284517 A1 | 11/2012 | Lambert | |
| 2013/0095789 A1* | 4/2013 | Keevill | ................ H04W 12/06 |
| | | | 455/411 |
| 2013/0230035 A1* | 9/2013 | Grandhi | ................ H04W 48/16 |
| | | | 370/338 |
| 2013/0247150 A1 | 9/2013 | Cherian et al. | |
| 2013/0300941 A1* | 11/2013 | Kafle | ................ H04L 27/0006 |
| | | | 348/725 |
| 2013/0301607 A1 | 11/2013 | McCann et al. | |
| 2014/0211705 A1* | 7/2014 | Baek | ................ H04W 76/023 |
| | | | 370/329 |
| 2015/0040195 A1 | 2/2015 | Park et al. | |
| 2015/0071271 A1* | 3/2015 | Smedman | ............. H04W 48/18 |
| | | | 370/338 |
| 2015/0281962 A1 | 10/2015 | Sun et al. | |
| 2015/0349857 A1* | 12/2015 | Cordeiro | .............. H04B 7/0413 |
| | | | 375/267 |
| 2015/0358389 A1* | 12/2015 | Vytla | ................ H04L 67/42 |
| | | | 709/203 |
| 2016/0043942 A1* | 2/2016 | Purohit | ............... H04W 40/244 |
| | | | 370/338 |
| 2016/0073429 A1* | 3/2016 | Oteri | ................. H04W 74/0816 |
| | | | 370/338 |
| 2016/0143069 A1* | 5/2016 | Xie | ....................... H04W 12/04 |
| | | | 370/329 |
| 2016/0192111 A1* | 6/2016 | Choi | ....................... H04L 67/26 |
| | | | 455/507 |
| 2016/0198350 A1* | 7/2016 | Lou | ................... H04W 72/0453 |
| | | | 370/252 |
| 2016/0234691 A1* | 8/2016 | Jeong | ...................... H04W 4/70 |
| 2016/0270129 A1* | 9/2016 | Wang | ................... H04W 48/14 |
| 2016/0330077 A1* | 11/2016 | Jin | ...................... H04L 41/0806 |
| 2016/0374118 A1* | 12/2016 | Mestanov | ............ H04W 12/06 |
| 2017/0134947 A1* | 5/2017 | Nilsson | ................. H04W 12/06 |
| 2017/0201411 A1* | 7/2017 | Mladin | ................. H04L 41/042 |
| 2017/0223479 A1* | 8/2017 | Ly | ............................. H04W 4/70 |
| 2017/0272295 A1* | 9/2017 | Lee | ..................... H04L 27/2608 |

FOREIGN PATENT DOCUMENTS

| | | |
|---|---|---|
| CN | 104602229 A | 5/2015 |
| JP | 2008514128 A | 5/2008 |
| JP | 2014526841 A | 10/2014 |
| KR | 20070102474 A | 10/2007 |
| RU | 2009112635 A | 10/2010 |
| WO | 2006032046 A1 | 3/2006 |
| WO | 2008030705 A2 | 3/2008 |
| WO | 2013040039 A1 | 3/2013 |
| WO | 2015006637 A1 | 1/2015 |
| WO | 2015038175 A1 | 3/2015 |

OTHER PUBLICATIONS

English abstract of CN104602229A.
International Search Report for International Application No. PCT/CN2016/076095 dated Jun. 3, 2016.
S. Frankel et al., "Establishing Wireless Robust Security Networks: A guide to IEEE 802.11i; Recommendations of the National Institute of Standards and Technology," Special Publication 800-97, National Institute of Standards and Technology, Feb. 2007.

* cited by examiner

Number of Octets of Nonce Field

Handshake Sub-Field

|  | 00 | 01 | 10 | 11 |
|---|---|---|---|---|
| 00 |  |  |  |  |
| 01 | 16 (Anonce) | 16 (Snonce) | 0 |  |
| 10 | 16 (Anonce) | 16 (Snonce) | 0 |  |
| 11 | 16 (Anonce) | 16 (Snonce) | 0 | 0 |

Type Sub-Field

FIG. 8

| OUI | Suite Type | Meaning | | |
|---|---|---|---|---|
| | | Authentication Type | Key Management Type | Key Management Type |
| 00-0F-AC | TBD | 11ay PBSS Fast (re)association/ re(authentication) using PSK defined in TBD | TBD | TBD |

METHOD AND APPARATUS FOR AUTHENTICATION OF WIRELESS DEVICES

CROSS REFERENCE TO RELATED APPLICATIONS

This patent application claims priority to U.S. Patent Application No. 62/214,370, filed on Sep. 4, 2015 and entitled "IEEE 802.11ay Fast Association & Authentication Protocol", which is hereby incorporated by reference herein as if reproduced in its entirety and this patent application claims priority to U.S. Patent Application No. 62/220,828, filed on Sep. 18, 2015 and entitled "METHOD AND APPARATUS FOR AUTHENTICATION OF WIRELESS DEVICES", which is also hereby incorporated by reference herein as if reproduced in its entirety.

FIELD OF THE INVENTION

The present invention pertains to the field of wireless network management, and in particular to a method and system for authentication of wireless devices, such as IEEE 802.11-compliant devices.

BACKGROUND

In order for wireless devices to gain full access to an IEEE 802.11-compliant wireless communication network, they must first become both authenticated and associated with the network. Authentication requires a wireless device to establish its identity, whereas network association corresponds to a registration of the wireless device with the network access point so that data can be properly delivered. Additionally, in order to establish a more secure network access, wireless devices sometimes undergo further authentication via the Robust Security Network Association (RSNA) algorithm.

However, current authentication and association procedures, particularly for Directional Multigigabit (DMG) and Enhanced Directional Multigigabit devices, are potentially time consuming. Multiple handshake messages, proceeding one at a time in strict sequence, can contribute to significant delay, which can be detrimental to some applications. For example, the document IEEE 802.11-2015/0625r1, entitled "IEEE 802.11 TGay Use Cases," May 2015, and available at https://mentor.ieee.org, proposes several use cases for future IEEE 802.11 network applications, some of which require wireless devices to access the network with very little delay. One such use case corresponds to Ultra Short Range (USR) communications, in which users wirelessly download mass data in less than 1 second at a distance of less than 10 cm. The link setup time is required to be less than 100 ms in this use case. As such, the current approach to association and authentication in IEEE 802.11 networks, and in particular for DMG and Enhanced DMG devices, can be inadequate for some current and future use cases.

Various IEEE 802.11 management frames include a section that contains one or a plurality of concatenated information elements. Selected types of information elements can be embedded within a given management frame. Existing types of information elements include those usable for communicating Service Set Identifier (SSID), supported data rates, parameter sets for configuring communication such as a frequency hopping parameter set, a direct sequence parameter set, a contention-free parameter set, a traffic indication map, an independent basis service set parameter set, and a challenge text, as well as vendor-specific information elements. The IEEE 802.11 standard is expandable to include further types of as-yet unspecified information elements.

Therefore, there is a need for a method and apparatus for authentication of wireless devices that mitigates one or more limitations of the prior art, such as time limitations due to latency of authentication procedures.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for authentication of wireless devices, such as DMG devices compliant with the existing IEEE 802.11ad standard, and/or Enhanced DMG devices compliant with the IEEE 802.11ay standard currently being developed on the basis of DMG. In accordance with embodiments of the present invention, there is provided a method for authenticating a Directional Multigigabit (DMG) Station (STA) (DMG STA) device for communication in an IEEE 802.11-compliant wireless network. The method comprises including one or more authentication information elements in one or more respective frames transmitted between an access point of the wireless network and the device. The one or more authentication information elements include data for use in an authentication procedure for establishing that both the access point and the device possess a common cryptographic key.

In accordance with embodiments of the present invention, there is provided an IEEE 802.11-compliant device comprising a processor coupled to a wireless network interface. The device, or more particularly the processor in concert with the wireless network interface, is configured to include one or more authentication information elements in one or more respective frames transmitted from the device to a second device via the wireless network. The one or more authentication information elements include data for use in an authentication procedure for establishing that both the device and the second device possess a common cryptographic key. The device may be a wireless communication device or an access point. The authentication information elements may be part of an authentication handshake procedure.

In accordance with embodiments of the present invention, there is provided a method for authenticating an IEEE 802.11-compliant wireless communication device. The method comprises generating an authentication information element comprising data for use in an authentication procedure for establishing that both the device and the second device possess a common cryptographic key. The data includes one or more of: a key identifier indicative of which key of a plurality of pre-shared keys is to be used in the authentication procedure; a Nonce for use in the authentication procedure; and a Message Integrity Code for use in the authentication procedure. The method further comprises including the authentication information element in a frame to be transmitted from the device to a second device via the wireless network interface. The device may be a wireless communication device or an access point. The authentication information elements may be part of an authentication handshake procedure.

In accordance with embodiments of the present invention, there is provided an IEEE 802.11-compliant wireless communication device comprising a processor coupled to a wireless network interface. The device, or more particularly the processor in concert with the wireless network interface, is configured to generate an authentication information element comprising data for use in an authentication procedure for establishing that both the device and the second device possess a common cryptographic key. The data includes one or more of: a key identifier indicative of which key of a plurality of pre-shared keys is to be used in the authentication procedure; a Nonce for use in the authentication procedure; and a Message Integrity Code for use in the authentication procedure. The device is further configured to include the authentication information element in a frame to be transmitted from the device to a second device via the wireless network interface. The device may be a wireless communication device or an access point. The authentication information elements may be part of an authentication handshake procedure.

In accordance with embodiments of the present invention, there is provided an Enhanced Directional Multigigabit Station device configured to: include an authentication information element in a management frame transmitted by the device during a network association procedure, the authentication information element usable in a pre-shared key based authentication and key generation procedure operating in parallel with the network association procedure, thereby reducing time to reach an associated and authenticated state involving the device.

BRIEF DESCRIPTION OF THE FIGURES

Further features and advantages of the present invention will become apparent from the following detailed description, taken in combination with the appended drawings, in which:

FIG. 8 illustrates a truth table showing various operational rules for handling authentication information elements, in accordance with embodiments of the present invention.

FIG. 9 illustrates a chart related to a proposed authentication key management suite for use in the in-development IEEE 802.11ay standard, according to an embodiment of the present invention.

FIG. 10 illustrates a Robust Secure Network (RSN) information element provided in accordance with embodiments of the present invention.

It will be noted that throughout the appended drawings, like features are identified by like reference numerals.

DETAILED DESCRIPTION

Figure 1:
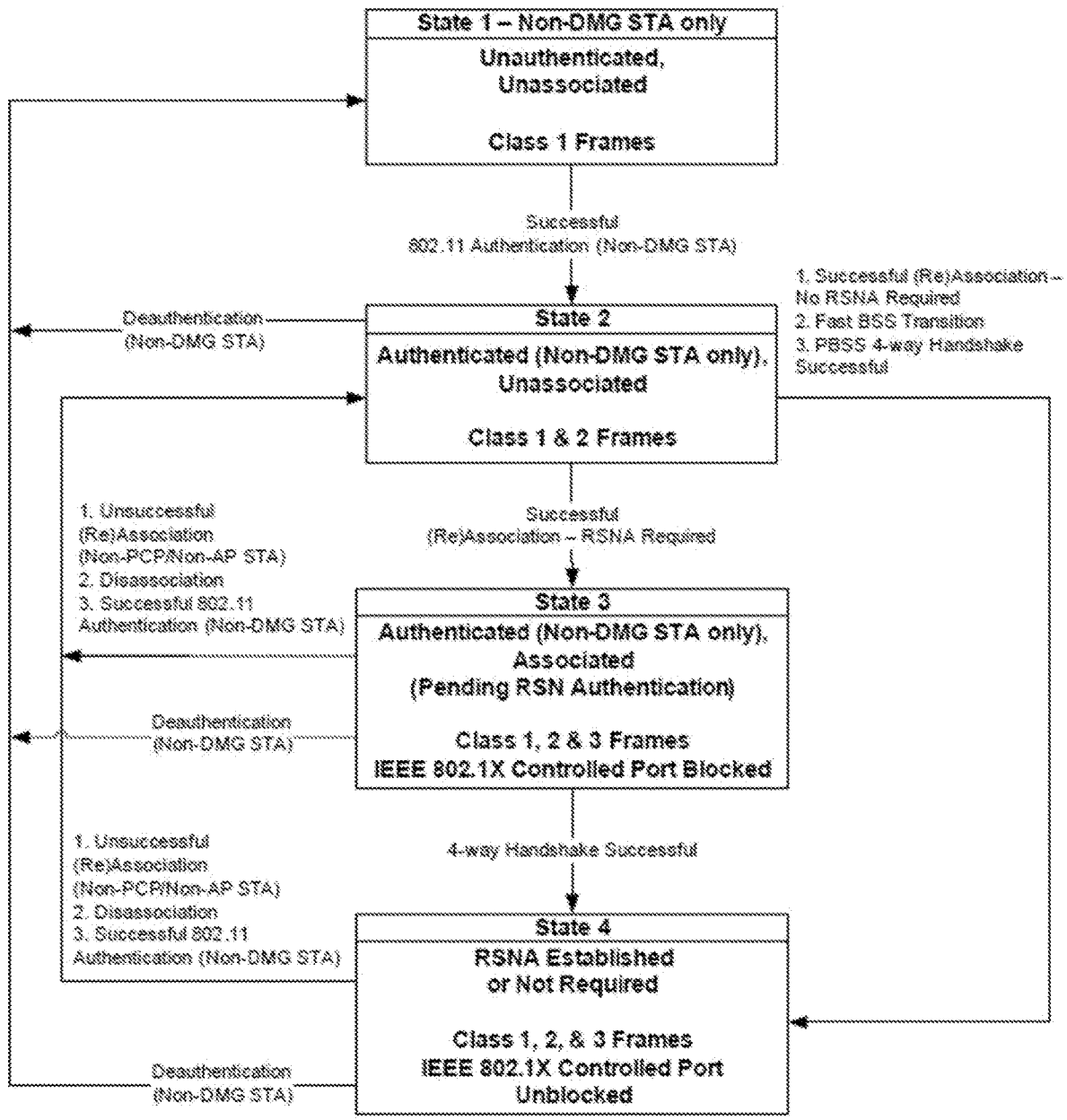
FIG. 1 illustrates an IEEE 802.11ad authentication state machine.

Embodiments of the present invention relate to the execution of authentication operations using information elements embedded into frames which are transmitted within an IEEE 802.11-compliant wireless communication network, such as but not necessarily limited to an IEEE 802.11ad or IEEE 802.11ay-compliant network. In various embodiments the frames containing the information elements are management frames. In such embodiments, the communication of various management frames, such as but not limited to frames associated with access and/or association of a wireless device to the IEEE 802.11 network, is modified so that the management frames include additional information used for authentication of the wireless device. The additional information can correspond to secure cryptographic key authentication. In one example, the authentication of the wireless device can be carried out concurrently with other tasks facilitated by the same management frames. As such, authentication can potentially be parallelized with other operations. Alternatively, the management frames can be used exclusively to carry out the authentication. The management frames can facilitate network access for the device concurrently, i.e. in parallel with authentication. The management frames with authentication information elements may be transmitted before and during IEEE 802.11 association procedures.

In various embodiments, the authentication information elements are piggybacked within other frames already being exchanged for another purpose, such as management frames being exchanged for association purposes or other purposes, or data frames, or the like. As such, the authentication procedure may not require its own separate dedicated frames. In the case of management frames, authentication can be performed substantially in parallel with management frames being exchanged for example to carry out an association process, thereby reducing time required to reach an associated and authenticated state. In various embodiments, parallel authentication can be carried out without first requiring the establishment of a particular state with respect to the wireless device, such as a network associated state.

In some embodiments, at least some of the frames containing the information elements are other frames, such as data frames. The data frames may also carry data to be transmitted to or from the wireless device. Data frames containing the authentication information elements, as well as other data frames communicated prior to authentication being completed, may be exchanged even though the wireless device has not yet been authenticated. As such, it may be desirable to exchange authentication information elements within the first few data frames being transmitted, in order to minimize the transmission of data before authentication is completed. In some embodiments, at least one of the management frames used for association of the wireless device plus at least one of the data frames transmitted subsequent to association are used to convey the authentication information elements. In some embodiments, the first few data frames exchanged following association may be used to carry some or all of the authentication information elements. An authentication information element in a data frame refers to a data element within the data frame that has the structure and/or content of the authentication information element as described herein.

Embodiments of the present invention are directed to a method for authenticating a device for communication in an IEEE 802.11-compliant wireless network. The device may be a wireless terminal, mobile device, or other device. The method includes adding an authentication information element to a frame which is transmitted between an access point of the wireless network and the device, for example from the access point to the device or vice-versa. The authentication information element includes data for use in an authentication procedure for establishing that both the access point and the device possess a common cryptographic key. In some embodiments, the frame is a management frame. In some embodiments, the frame is a data frame or another type of frame.

In some embodiments, the data can include one or more of: a key identifier indicative of which key of a plurality of pre-shared keys is to be used in the authentication procedure; a Nonce for use in the authentication procedure; and a Message Integrity Code for use in the authentication procedure. Each authentication information element can be customized to carry one or more selected types of data, depending on what is currently required for the authentication procedure. The selected types of data being carried can be identified by analysis of certain fields within the authentication information element. Additionally or alternatively, the selected type of data being carried can be identified based on a context of transmission of the authentication information element.

In various embodiments, a wireless communication device is configured to set an indicator bit (flag) in an appropriate frame transmitted between devices, such as a management frame and more particularly a Robust Security Network (RSN) capability field within a management frame. A previously reserved or unused bit of the RSN capability field may be used as the indicator bit. The indicator bit, when set, may be used to initiate usage of an authentication procedure as described herein, in particular including authentication using the described authentication information elements.

In some embodiments, the method includes adding a sequence of authentication information elements to a respective sequence of frames, such as management frames, data frames, or a combination thereof, which are exchanged between an access point of the wireless network and the device. As such, the authentication information elements are also exchanged between the access point and the device. In various embodiments, the exchanges are sequential, and the content of certain authentication information elements can depend on the content of previously received authentication information elements. The exchange of authentication information elements is configured and used to carry out an authentication handshake procedure for establishing that both the access point and the device possess a common cryptographic key.

In various embodiments, including an authentication information element in a frame, such as a management frame, involves appending the authentication information element to the frame.

The management frames can include, for example, Beacon frames, Announcement frames, Probe request frames, Probe response frames, Association request frames, Association response frames, Re-association request frames, Re-association response frames, and SSW frames. A sequence of management frames being exchanged as part of a network access and/or association operation may be identified and used to communicate authentication information elements between the device and the access point in a desired sequence. The desired sequence can also specify directionality of information exchanges. For example, in one embodiment a first authentication information element is transmitted from an access point to a user device, a second authentication information element is transmitted from the user device to the access point, and so on.

Although various embodiments of the present invention rely on the use of management frames, such as management frames passed as part of a network access and/or association procedure, to piggyback authentication information, it is contemplated that, as already noted above, the authentication information elements can be included in other messages routinely passed between devices and access points. Such messages may be used for network access, network association, data exchange, or another purpose. Pre-existing message types are thus adjusted to include a sequence of authentication information elements. The pre-existing message types may be defined according to a protocol or standard and may be configured to behave in a certain way that is amenable to carrying out the authentication procedure. In particular, the message types may be exchanged in a particular sequence and with a particular combination of directions (e.g. from device to access point or vice-versa) that matches the sequence and message directionality desired for the exchange of authentication information elements. In the case of data frames, a subsequence of all data frames being transmitted to and from the wireless device may be selected for carrying the authentication information elements. The subsequence may correspond to data frames being exchanged in the particular combination of directions that matches the sequence and message directionality desired for the exchange of the authentication information elements.

As noted above, the exchange of authentication information elements is configured and used to establish that both the access point and the device possess a common cryptographic key. In some embodiments, this key may be one of several shared keys which are possessed by both the access point and the device. In this case, defining which of the several shared keys is being used as the common cryptographic key may also proceed, for example as described below. In particular, an authentication information element can include a key identifier indicative of which of the shared keys is being used. In other embodiments, only one shared key may be possessed by both the access point and the device.

Various approaches for establishing that two parties possess a common cryptographic key, without transmitting the key over a potentially unsecure channel, may be employed. In particular, embodiments of the present invention employ a method for establishing a Robust Security Network Association (RSNA). A method such as the one encapsulated in the EAPoL frames, which refers to Extensible Authentication Protocol (EAP) over Local Area Network (LAN), in accordance with IEEE 802.11 usage IEEE 802.1x protocol, may be used for this purpose. This may include performing part or all of a four-way handshake within the authentication IE instead of EAPoL frame. In some embodiments, the first three parts of the four-way handshake may be performed. That is, the ending acknowledgement message of the four-way handshake may be omitted or optional. This modified version of the four-way handshake is referred to herein as an abbreviated handshakes. In various embodiments, this form of handshake with the ending acknowledgement message omitted or optional may be employed when it provides an adequate level of network security for the particular application. In various embodiments, an authentication information element includes a field indicative of which handshake message, of the four-way handshake or abbreviated handshake, is being conveyed.

Some embodiments of the present invention are directed in particular to the operation and accommodation of Directional Multigigabit (DMG) devices, which may include Enhanced DMG (EDMG) devices, and access points capable of serving DMG or EDMG terminal devices. DMG devices communicate wirelessly via a highly directional beam and over a relatively short range, for example on the order of several centimeters or several meters, depending on the application. Communication may be in the 60 GHz band and may attain a data rate of several (e.g. 20) Gigabits per second, for example. A device may refer to a Directional Multigigabit (DMG) Station (STA), as set forth in the IEEE 802.11ad and draft IEEE 802.11ay standards. Further, an access point may refer to a Personal Basic Service Set (PBSS) Control Point/Access Point (PCP/AP), as set forth in the IEEE 802.11ad and draft IEEE 802.11ay standards. Although various examples and embodiments described herein refer to a DMG STA and PCP/AP, it should be readily understood that other types of wireless devices may be used in place of the DMG STA, and other types of access points may be used in place of the PCP/AP.

Some embodiments of the present invention are directed to specific operating situations or use cases involving DMG devices. In particular, in various embodiments, the present invention is employed for authentication and association of a DMG device with an access point, in situations where the potential for eavesdropping or man-in-the-middle attacks is mitigated. Such a situation may correspond to the DMG device being in close proximity to the access point, with no other devices expected to be in close proximity to the access point.

As an example, the DMG device and access point may engage in Ultra Short Range (USR) communications, in which a portable user device is wirelessly connected to a fixed device such as a tollgate or kiosk. The portable user device may download mass data from the fixed device within a limited time frame, such as 5 seconds, for example. The link distance can be about 10 cm, typically with line-of-sight transmission. Only a single portable user device is connected to the fixed device at a time, typically with no interference from other devices.

As another example, the DMG device and access point may correspond to two devices operating in close proximity in a smart home. A source device, such as a set-top box, media player, tablet or smart phone, may stream data such as media content to a sink device, such as a smart TV or display. The devices are typically operating in close proximity, for example at a distance of less than 5 meters. Only a single link exists at a given time, typically with no interference from other devices.

The above two examples may correspond to Use Cases #1 and #2, as set forth in the document "IEEE 802.11 TGay Use Cases," as cited in the background of this document.

Embodiments of the present invention are directed to an IEEE 802.11-compliant wireless communication device. The device includes at least a processor, typically connected to a memory component, the processor connected to a wireless network interface capable of two-way communication with an access point in an IEEE 802.11-compliant manner. The processor and wireless network interface are cooperatively configured to include an authentication information element in a frame, such as a management frame or other frame, for transmission from the device to an IEEE 802.11-compliant access point of the wireless network. The authentication information element includes data for use in an authentication procedure for establishing that both the access point and the device possess a common cryptographic key.

In some embodiments, the processor and wireless network interface are cooperatively configured to read an authentication information element from a frame, such as a management frame or other frame, received by the device, for example from the IEEE 802.11-compliant access point.

In some embodiments, the processor is further configured to perform at least part of the authentication procedure. Additionally or alternatively, a processor of the access point may be configured to perform at least part of the authentication procedure.

In some embodiments, the processor and wireless network interface of the device are cooperatively configured to read a first set of authentication information elements from respective frames of a first set of frames transmitted by the IEEE 802.11-compliant access point. The processor and wireless network interface are further cooperatively configured to include a second set of authentication information elements in a second set of frames transmitted from the wireless communication device for receipt by the access point. The first and second sets of frames are thereby used to exchange the first and second sets of authentication information elements between the access point and the device. Some or all of the first and second sets of frames may be management frames. The first and second sets of authentication information elements include a sequence of data elements. The processor may further be configured to use the exchanged sequence of data elements to carry out an authentication handshake procedure for establishing that both the access point and the device possess a common cryptographic key. Additionally or alternatively, a processor of the access point may be configured to use the exchanged authentication information elements to establish that both the access point and the device possess a common cryptographic key. In some embodiments, the first and second sets of management frames carrying the authentication information elements may also be used to concurrently establish network access by the wireless communication device.

Embodiments of the present invention are directed to an IEEE 802.11-compliant access point, such as an IEEE 802.11ad or IEEE 802.11ay-compliant access point. The access point includes at least a processor, typically connected to a memory component, the processor connected to a wireless network interface capable of two-way communication with other devices in an IEEE 802.11-compliant manner. The processor and wireless network interface are cooperatively configured to include an authentication information element in a frame, such as a management frame, for transmission from the device to an IEEE 802.11-compliant wireless communication device of the wireless network. The authentication information element includes data for use in an authentication procedure for establishing that both the access point and the device possess a common cryptographic key.

In some embodiments, the processor and wireless network interface are cooperatively configured to read an authentication information element from a frame received by the access point, for example from the IEEE 802.11-compliant wireless communication device. In some embodiments, the processor is further configured to perform at least part of the authentication procedure.

In some embodiments, the processor and wireless network interface of the access point are cooperatively configured to include a first set of authentication information elements in respective frames of a first set of frames transmitted by the access point. The processor and wireless network interface are further cooperatively configured to read a second set of authentication information elements from a second set of frames transmitted from an IEEE 802.11-compliant wireless communication device. The first and second sets of frames are thereby used to exchange the first and second sets of authentication information elements between the access point and the device. The first and second sets of authentication information elements include a sequence of data elements. The processor is further configured to use the exchanged sequence of data elements to carry out an authentication handshake procedure for establishing that both the access point and the device possess a common cryptographic key. The first and second sets of frames may be management frames which are also be used to concurrently establish network access by the wireless communication device.

FIG. 1 illustrates a version of an authentication state machine as set forth in Section 10.3.2 of the IEEE 802.11ad standard. For DMG STA devices, the state machine begins at State 2 and proceeds to State 4, typically via State 3. The state machine is used herein to represent device behaviour and internal logical state in a simplified format, as it pertains to association and authentication. As such, statements that a device is in a particular state of the state machine should be interpreted as statements regarding the device's behaviour and internal logical state. As illustrated, a possible direct transition from State 2 to State 4 is specified when the PBSS four-way handshake is successful. However, it is observed herein that the IEEE 802.11ad standard specifies that the PBSS four-way handshake can only take place from State 3. As such, this particular shortcut transition is not currently fully enabled.

Figure 2:
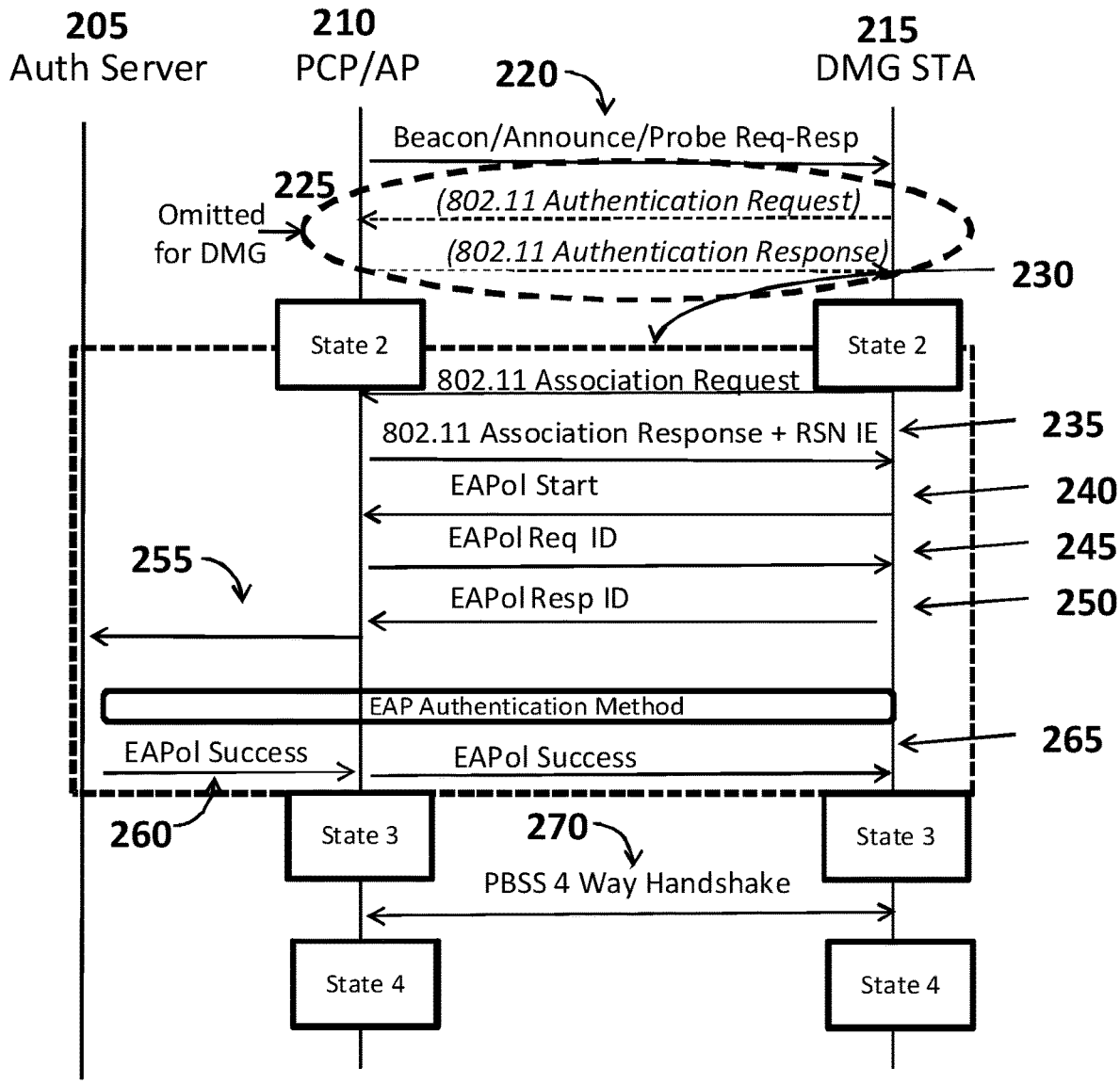
FIG. 2 illustrates a diagram showing an IEEE 802.11 authentication/association process.

FIG. 2 illustrates an authentication/association flow, with Trusted Third Party (TTP) authentication, in accordance with the IEEE 802.11ad standard, for example as set forth in Section 11.5.1.3.5 of this standard. The IEEE 802.11 Authentication Request and IEEE 802.11 Authentication Response messages are unused for communication with DMG STA devices. The Association and Authentication steps are lock step procedures which are compliant with the RSNA trust model. However, these sequentially performed procedures take significant time to complete.

In more detail, FIG. 2 illustrates a progression between States 2, 3 and 4 (corresponding to States 2, 3 and 4 of FIG. 1), in relation to device association and authentication. An access point, such as a PBSS Control Point/Access Point (PCP/AP) 210, initially transmits a first management frame 220, which may be a Beacon frame, Announcement frame, or Probe response frame. The first management frame is received by a DMG STA 215 for which secure attachment to the network served by the access point (PCP/AP) is desired. Since the device is a DMG device, the normally-present 802.11 Authentication Request and 802.11 Authentication Response messages 225 are omitted and the state machine proceeds to State 2, as set forth in the standard.

Proceeding from State 2, the DMG STA transmits an 802.11 association request 230 to the access point (PCP/AP). In response, the access point (PCP/AP) transmits an 802.11 association response 235 to the DMG STA, along with a Robust Secure Network (RSN) Information Element (IE). Subsequently, an EAPol authentication process is initiated by the transmission of an EAPol Start frame 240 from the DMG STA to the access point (PCP/AP). The access point (PCP/AP) transmits an EAP-Request Identity frame 245 to the DMG STA, and the DMG STA responds by transmitting an EAP-Response Identity frame 250 to the access point (PCP/AP). The EAP-Response Identity frame includes an identifier associated with the DMG STA such as a User ID.

Following receipt of the identifier from the DMG STA, the access point (PCP/AP) transmits a Remote Authentication Dial-In User Service (RADIUS) request message 255 to a trusted third party Authentication Server. Following successful third party authentication, the Authentication Server transmits an EAP Success message 260 to the access point (PCP/AP). In response, the access point (PCP/AP) transmits an EAPol Success frame 265 to the DMG STA. Both the access point (PCP/AP) and DMG STA subsequently enter State 3.

The above operations corresponding to progression from State 2 to State 3 can correspond to an EAP authentication. A portion of the EAP authentication is piggybacked over the EAPol management frames communicated between the access point (PCP/AP) and the DMG STA. Another portion is performed via a Radius request from the access point (PCP/AP) to the Authentication Server and a corresponding response from the Authentication server.

Continuing with respect to FIG. 2, progression from State 3 (in which authentication and association have been established) to State 4 (in which RSNA status is established, where required), proceeds generally via the successful execution of a PBSS four-way handshake 270. The PBSS four-way handshake involves: transmitting a first Nonce value (ANonce) from the access point (PCP/AP) to the DMG STA; constructing a Pairwise Transient Key (PTK) by the DMG STA; transmitting a second Nonce value (SNonce) along with a Message Integrity Check (MIC) from the DMG STA to the access point (PCP/AP); constructing the PTK by the access point (PCP/AP); constructing and sending a Group Temporal Key (GTK) along with a MIC from the access point (PCP/AP) to the DMG STA; and transmitting an acknowledgement from the DMG STA to the access point (PCP/AP).

It is noted that the above procedure of FIG. 2 is illustrative only and can be adjusted in various conventional ways as would be readily understood by a worker skilled in the art. For example, whereas the above may employ EAP authentication, other conventional authentication methods may be possible.

Some embodiments of the present invention provide an authentication mechanism taking less time and exchanging fewer messages, while maintaining at least partial backward compatibility with the IEEE 802.11ad standard. For example, the authentication and association schemes as described in Sections 10.3.2 and 11.5.1.3.5 of the IEEE 802.11ad standard may be kept intact. In addition, the existing RSNA-compliant authentication/association state machine as described in the IEEE 802.1x authentication protocol may be utilized in embodiments of the present invention, as described herein.

Some embodiments of the present invention are used for authentication and association in particular situations, rather than in all situations. Furthermore, it is noted that in some situations, devices have different pre-shared credentials than in other situations. For example, devices in the USR and Smart home situations, as described above and in Use Cases #1 and #2 of the above-cited "IEEE 802.11 TGay Use Cases" document, may have pre-shared credentials of a first type, whereas devices in the data center inter-rack connectivity applications and video/mass-data distribution or video on demand systems, as described in Use Cases #4 and #5 of the above-cited "IEEE 802.11 TGay Use Cases" document, may have pre-shared credentials of a second, different type. Different authentication schemes may be required to meet the potentially different timing requirements of these different situations. Further, other authentication and association procedures, such as legacy IEEE 802.11ad procedures, may be used for authentication and association in some situations.

Figure 3:
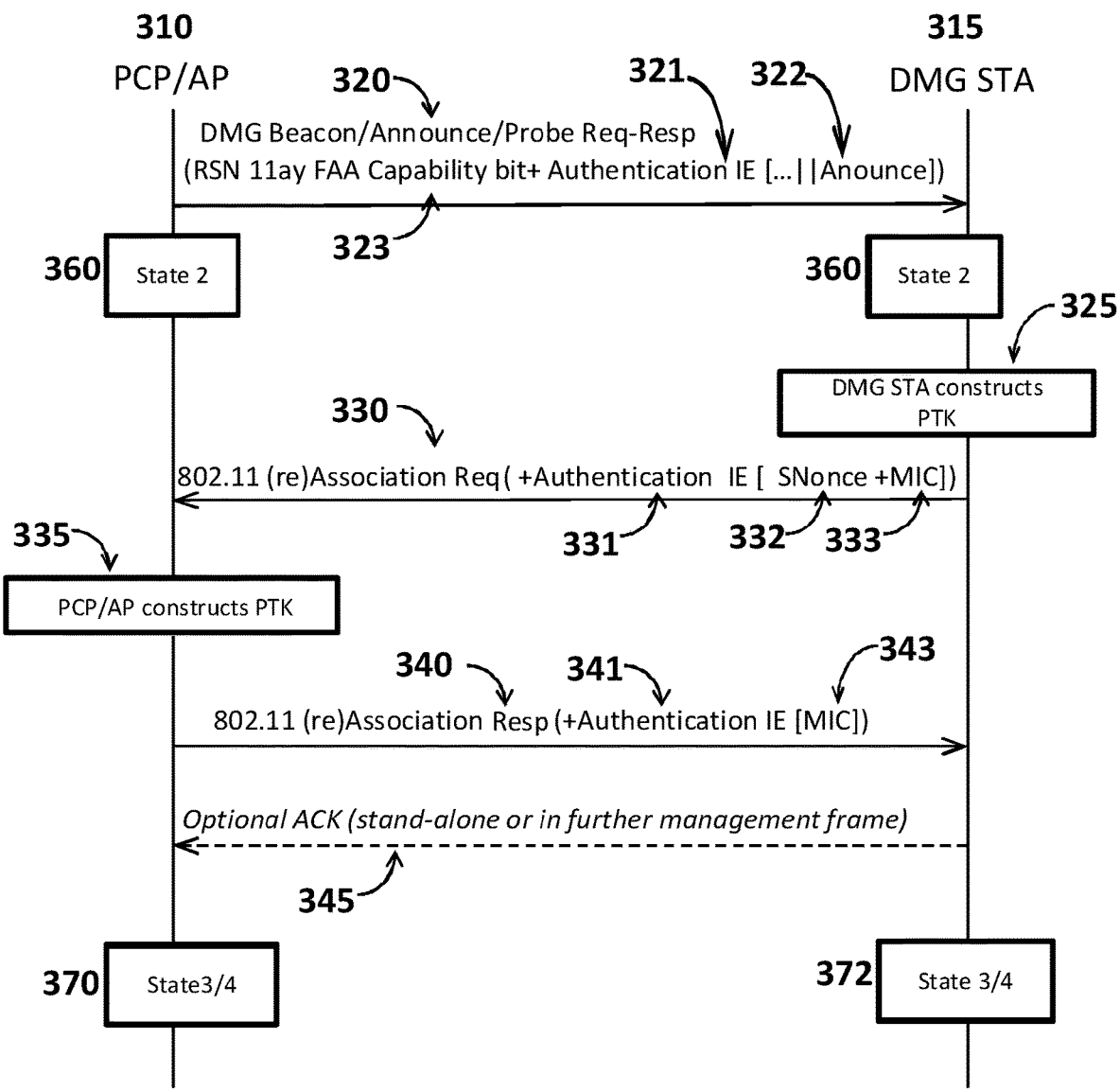
FIG. 3 illustrates a diagram showing an authentication/association process, in accordance with embodiments of the present invention.

FIG. 3 illustrates an association and authentication procedure for use in an IEEE 802.11-compliant network in accordance with embodiments of the present invention. This embodiment may correspond for example to the Directional Multigigabit (DMG) scenario, in which the device and access point communicate wirelessly via a highly directional beam and over a relatively short range. This embodiment uses DMG management frames to convey the authentication information elements. Furthermore, in various embodiments, the device and access point are in close proximity, and no other devices are in close proximity to the access point. As such, various security issues such as eavesdropping or man-in-the-middle attacks may be mitigated. In what follows, it should be understood that construction of keys such as the Pairwise Transient Key (PTK), generation of Nonces and Message Integrity Checks (MIC) and other operations related to encryption and authentication, may be performed similarly to the analogous operations of the conventional PBSS four-way handshake. As such, various conventional implementation details for such operations are omitted below.

With reference to FIG. 3, the access point (PCP/AP) 310 transmits a first DMG management frame 320, such as a Beacon frame, Announcement frame, or Probe response frame. Included in the first management frame, for example appended to the first management frame, is a first authentication information element 321, along with a flag bit 323 indicating that the parallel authentication procedure as described herein is available for use. The first authentication information element includes a first Nonce 322, labelled ANonce, possibly along with (e.g. concatenated with) other information.

The first management frame 320, including the first authentication information element, is received by a DMG STA 315. As in the scenario of FIG. 2, for the DMG scenario, both the access point and device are initially considered to be in State 2 360 of the authentication state machine. Subsequently, the DMG STA constructs 325 a Pairwise Transient Key (PTK) based on information including the received ANonce, a second Nonce generated by the DMG STA, labelled SNonce, and a pre-shared key.

Additionally, the DMG STA prepares and transmits a second management frame 330, which is either an 802.11 Association Request management frame or an 802.11 Re-association Request management frame, depending on whether association or re-association, as set forth in the 802.11 standard, is desired. Included in the second management frame, for example appended thereto, is a second authentication information element 331. The second authentication information element includes the second Nonce, SNonce 332, as generated by the DMG STA, as well as a Message Integrity Check (MIC) value 333 generated for the second authentication information element, viewed as a message. The MIC value is calculated over the authentication information element as specified in Sections 11.6.6 and M2.2 of the IEEE standards document, "Part 11: Wireless LAN Medium Access Control (MAC) and Physical Layer (PHY) Specifications," Version 12.0, IEEE Computer Society March 2012. The IEEE 802.11REVmb-D12.0 standards document also describes MIC value calculation. MIC values are derived by providing a message, potentially along with a shared secret key, as input to a MIC hash function, the output of the MIC hash function corresponding to the MIC value.

Following receipt of the second Nonce SNonce by the access point (PCP/AP), the access point (PCP/AP) constructs 335 the PTK based on information including the first Nonce, the received second Nonce, and the pre-shared key. The MIC received in the second management frame is also validated. For example, the PTK, as constructed by the access point (PCP/AP), can be used to generate another copy of the MIC based on the received message, and the generated and received copies of the MIC can be compared to determine whether they match. (A match suggests that the same PTK is shared by both the access point (PCP/AP) and the DMG STA.) If a match exists, the access point (PCP/AP) may deem authentication to be established.

The access point (PCP/AP) prepares and transmits a third management frame 340, which is either an 802.11 Association Response management frame or an 802.11 Re-association Response management frame, depending on whether association or re-association, as set forth in the 802.11 standard, is desired. Included in the third management frame, for example appended thereto, is a third authentication information element 341. The third authentication information element 341 includes a further Message Integrity Check (MIC) value 343. The further MIC value 343 is generated based on content of the third authentication information element, viewed as a message being input to the corresponding MIC hash function, potentially along with a shared secret key.

Subsequently, following receipt of the third authentication information element by the DMG STA, the DMG STA compares the MIC included in the third authentication information element to a corresponding further MIC generated by the DMG STA based on the received authentication information element. The generated and received copies of the MIC can be compared to determine whether they match. If a match exists, the DMG STA may deem authentication to be established.

Subsequent to the access point (PCP/AP) deeming that authentication as well as association is established, the access point (PCP/AP) proceeds to both State 3 and State 4 370 of the authentication/association state machine (denoted State 3/4). Subsequent to the DMG STA deeming that authentication is established, the DMG STA also proceeds to both State 3 and State 4 372 of the authentication/association state machine. More generally, the access point (PCP/AP)

and DMG STA may deem authentication and association to be established following successful completion of the messaging and MIC verification as described above.

Concurrently with authentication, the messaging illustrated in FIG. 3 also performs an 802.11 association or re-association operation. That is, the first, second and third management frames facilitate association or re-association of the DMG STA and the access point (PCP/AP), as described below.

The 802.11 Association Request management frame or 802.11 Re-association Request management frame includes relevant information for use by an access point. In particular the information is used by the access point for allocating resources for and synchronizing with a device's radio network interface controller (NIC). The association request frame carries information about the NIC, such as supported data rates, and the Service Set Identifier (SSID) of the target network.

The 802.11 Association Response management frame or 802.11 Re-association Response management frame includes an indication of acceptance or rejection of the association or re-association request. The frame may include further information such as an association identifier and supported data rates.

It is noted that an acknowledgement message from the DMG STA to the access point (PCP/AP), which is included in conventional forms of the PBSS four-way handshake, is omitted in various embodiments of the present invention. This omission may reduce messaging overhead and shorten the length of the association/authentication procedure. For various scenarios, such as those in which the device and access point are in close proximity and no other devices are in close proximity to the access point, this omission may be acceptable from a security point of view as long as an adequate level of security is provided. FIG. 3 illustrates an optional acknowledgement message 345, analogous to that of the PBSS four-way handshake, which may be included in some embodiments of the present invention, for example for key confirmation purposes. This acknowledgement message may be transmitted on its own or as a further authentication information element included in or appended to a further frame, such as a management frame or a data frame, transmitted from the DMG STA to the access point (PCP/AP). In some embodiments, the acknowledgement message is included in an acknowledgement frame or a Sector Sweep (SSW) report frame.

In some embodiments, the present invention is implemented under certain conditions, for example when the conventionally used state variable "dot11RSNAActivated" is set to TRUE, and the RSNA in use in the PBSS is based on the IEEE 802.1x authentication and key management protocol. The usage of the "dot11RSNAActivated" state variable is described in Table 8-20 (Page 465) of IEEE 802.11REVmb-D12.0 standards document. The dot11RSNAActivated state variable is provided within an indication transmitted from the access point (e.g. the PCP/AP) via a beacon. A TRUE value of the state variable advertises that the access point supports RSNA authentication. The DMG STA device in receipt of the TRUE value of the state variable is configured to respond by implementing concurrent authentication and association in accordance with the present invention.

In some embodiments, the present invention provides authentication without requiring a trusted third party authentication server. This may expedite authentication.

In various embodiments, the pre-shared key used to generate the PTK is a common secret key K. The common secret key K may be at different length, but in various embodiments it is recommended to be at least 128 bits to achieve RSNA compliant level of security assurance. The common shared key may be established in a cryptographically secure manner, for example in accordance with "Establishing Wireless Robust Security Networks: A guide to IEEE 802.11i; Recommendations of the National Institute of Standards and Technology," Special Publication 800-97, S. Frankel et al., National Institute of Standards and Technology, February 2007.

In some embodiments, the frames exchanged in FIG. 3 include optional Multi-Band Operation (MBO) parameters for supporting MBO operations, for example as described with respect to conventional PBSS four-way handshake messages.

In some embodiments, rather than having a single pre-shared key K, devices store multiple pre-shared keys, or keychain in memory. A particular one of the shared keys can then be selected for use in authentication. Use of a keychain may improve security. The identity of the selected pre-shared key can be communicated in a secure manner between devices at the time of authentication. The selection of the pre-shared key may be performed by either of the devices (e.g. DMG STA or PCP/AP or other access point) participating in the authentication procedure. The device performing key selection then communicates to the other device an indication of which key has been selected. Each of the pre-shared keys may be associated with a corresponding index value. The associations between keys and index values may also be pre-shared and hence common to both devices. Communicating a key selection may include communicating the corresponding index value. The index value can be communicated in a designated Key ID field of an authentication information element.

In some embodiments, one of the devices retains in memory a first subset of a predetermined set of keys, and another of the devices retains a second subset of the set of keys. The first and second subsets each include at least one key, and the first and second subsets at least partially overlap. The intersection of the first and second subsets therefore includes at least one key, which is a pre-shared key. In some embodiments, the second subset is completely included within the first subset. For example, the first subset may equal the entire set of keys (such that the first set is a non-proper subset), whereas the second subset may be a proper subset of the entire set of keys. In this case, the device holding the second subset performs key selection, so as to guarantee that the other device also holds the selected key. The device holding the first subset may be the device which for which it is more practical to store potentially large amounts of data, for example the access point.

In some embodiments, an access point (e.g. PCP/AP) is associated with a toll gate configured for Ultra-Short Range communication with various DMG STA devices. The access point may maintain up to several thousand pre-shared secret keys K, in order to support potentially large numbers of DMG STA devices. Each DMG STA device may include a distinct subset of one or more of the pre-shared keys, such that different DMG STA devices do not have or are unlikely to have the same pre-shared key. This mitigates the potential for a key forgery attack. When initiating authentication, a DMG STA device is configured to indicate the index of the pre-shared key it intends to use.

Figure 4:
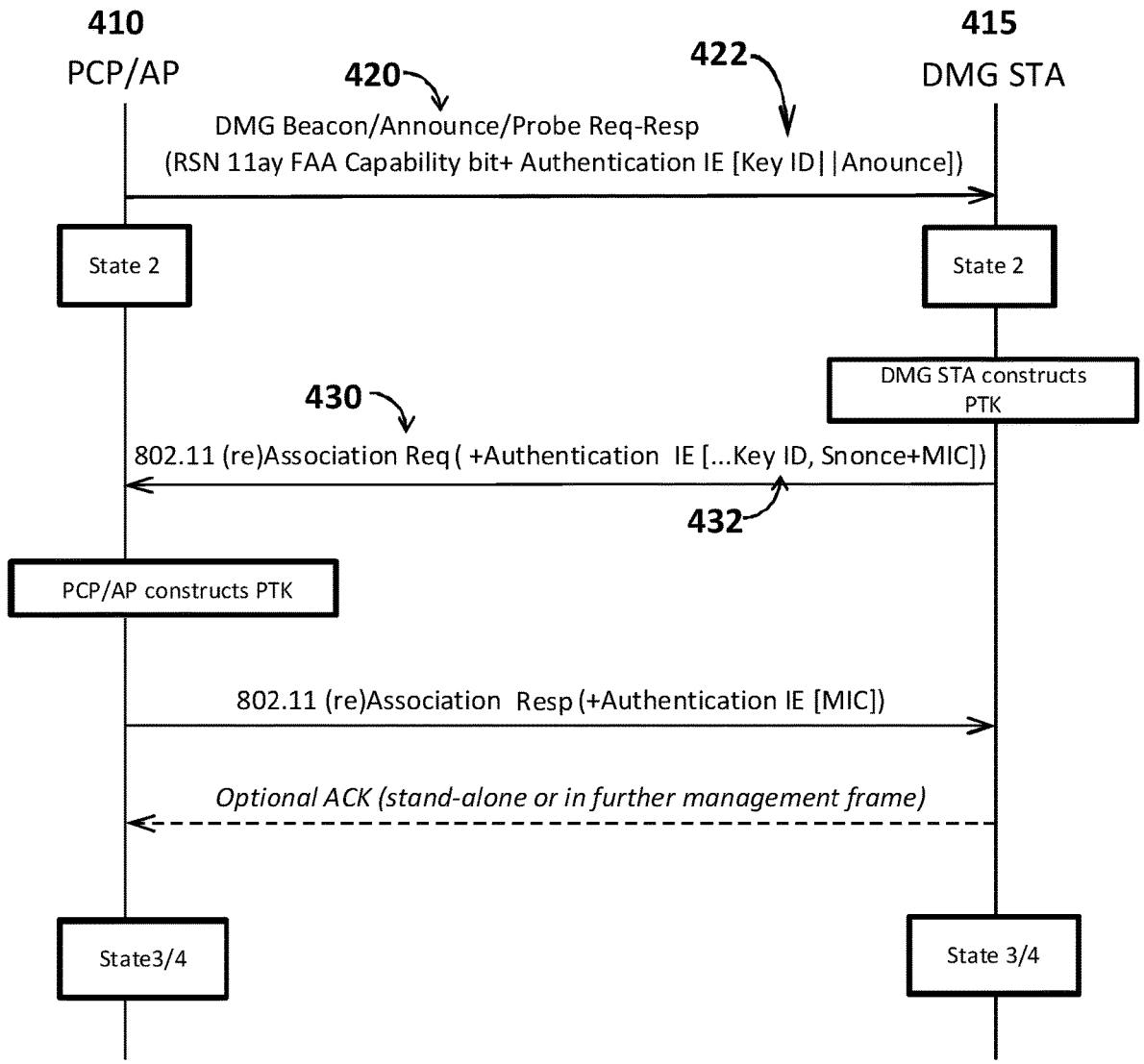
FIG. 4 illustrates a diagram showing an authentication/association process, in accordance with other embodiments of the present invention.

FIG. 4 illustrates another authentication procedure for use in an IEEE 802.11-compliant network in accordance with embodiments of the present invention. This procedure is similar to that of FIG. 3, except that the access point (PCP/AP) 410 selects a pre-shared key and transmits the corresponding key identifier to the DMG STA. In the first management frame 420, the access point (PCP/AP) includes the selected key identifier as a Key ID 422 value which is concatenated or otherwise included with the first Nonce value ANonce within a designated Nonce field of the first authentication information element transmitted to the DMG STA. The DMG STA selects the pre-shared key corresponding to the received Key ID and uses the selected key in the remainder of the authentication procedure. The DMG STA also includes the value Key ID 432 within a designated Key ID field of an authentication information element included in the second management frame 430. The Key ID field can be 8 bytes long and is followed by the ANonce field. The Key ID may be used in the second management frame as part of the message data upon which generation of the MIC is based. The remainder of the procedure of FIG. 4 may proceed as described above with respect to FIG. 3.

Figure 5:
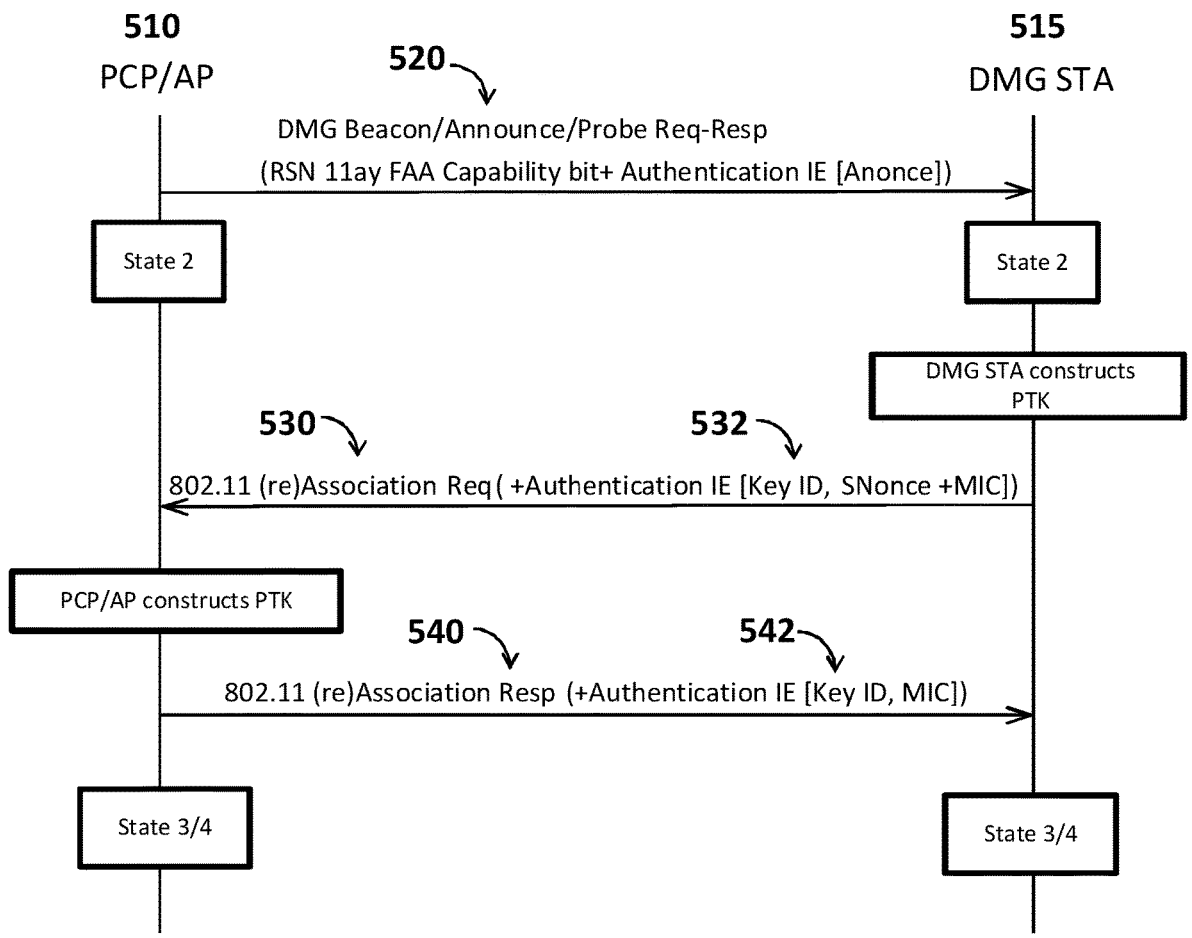
FIG. 5 illustrates a diagram showing an authentication/association process, in accordance with other embodiments of the present invention.

FIG. 5 illustrates yet another authentication procedure for use in an IEEE 802.11-compliant network in accordance with embodiments of the present invention. This procedure is similar to that of FIG. 3, except that the DMG STA 515 selects a pre-shared key and transmits the corresponding key identifier to the access point (PCP/AP) 510, within a designated Key ID field of an authentication information element included in the second management frame 530. The first management frame 520 proceeds as described above with respect to FIG. 3, possibly with an indicator that the DMG STA is to select a pre-shared key. The DMG STA includes the selected key identifier as a value Key ID 532 in the second management frame 530, along with the second Nonce value SNonce and the MIC, also within the second authentication information element which is included in the second management frame 530 and transmitted to the access point (PCP/AP). The DMG STA may attach the Key ID in the second authentication information element included with the association request frame to indicate which key it intends to use for the current session. The access point (PCP/AP) selects the pre-shared key corresponding to the received Key ID and uses the selected key in the remainder of the authentication procedure. In the third management frame 540, the access point (PCP/AP) also includes the value Key ID 542 in a designated Key ID field of a third authentication information element included with the third management frame. The Key ID may be used in the third management frame as part of the message data upon which generation of the MIC is based. The remainder of the procedure of FIG. 5 may proceed as described above with respect to FIG. 3.

Figure 6A:
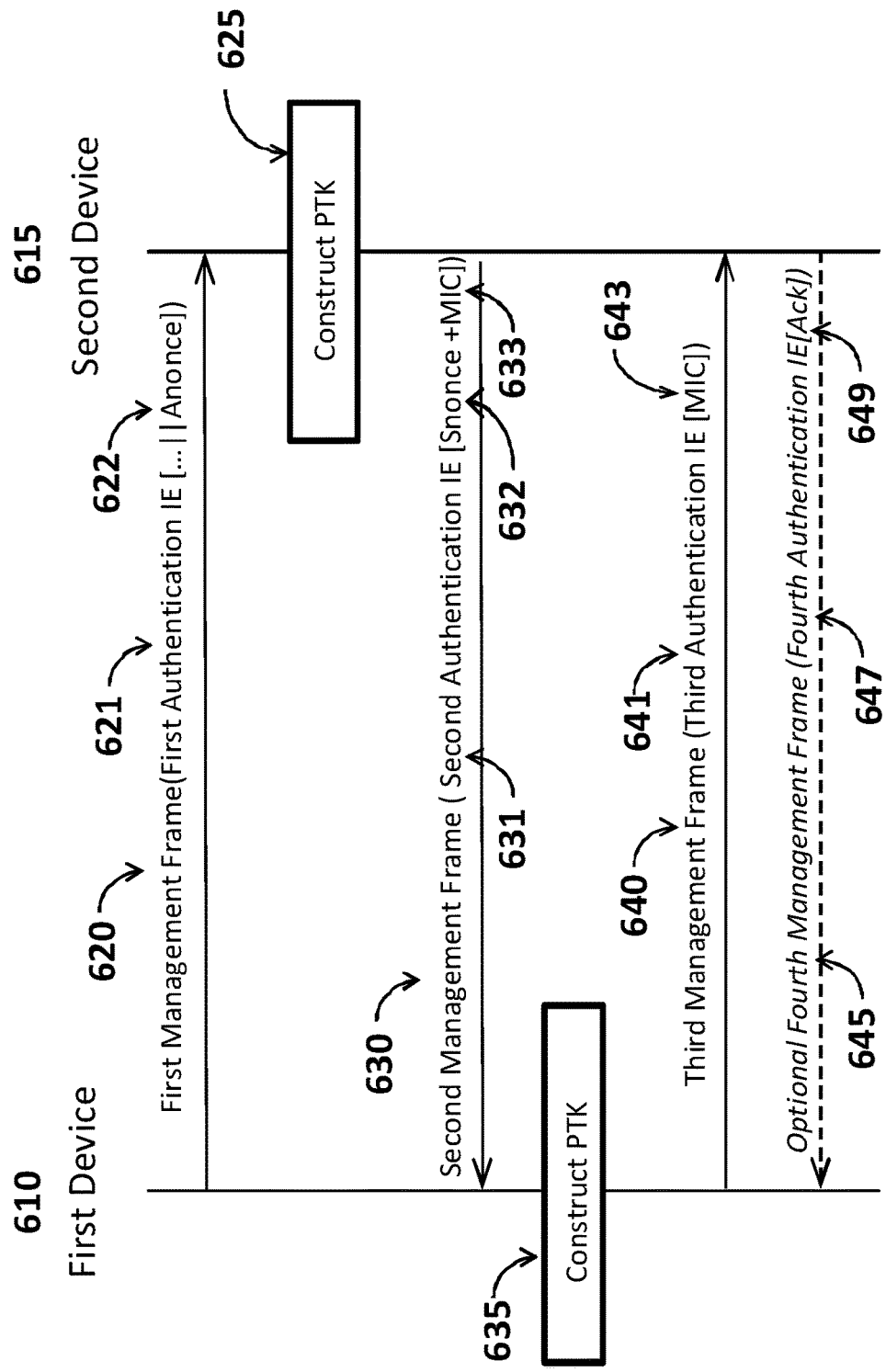
FIG. 6A illustrates a diagram showing an authentication/association process, in accordance with other embodiments of the present invention.

FIG. 6A illustrates an authentication procedure for use in an IEEE 802.11-compliant network in accordance with other embodiments of the present invention. In contrast with the embodiments illustrated in FIGS. 3 to 5, the authentication procedure is not necessarily performed concurrently with an association procedure. Rather, the authentication procedure can be performed using other types of management frames. The states of the authentication state machine as described in FIGS. 2 to 5 are not explicitly referenced in FIG. 6A, however, in various embodiments they may be included in the same manner as is illustrated in FIGS. 3 to 5. Furthermore, in some embodiments, the authentication information elements illustrated in FIG. 6 may include indications of pre-shared keys in a Key ID field, in a manner that is similar to the embodiments described with respect to FIGS. 4 and 5. Yet further, the management frames illustrated in FIG. 6 may potentially be interspersed with other management frames which are not illustrated. Where omitted, details of operations described with respect to FIG. 6A may proceed similarly to those described in FIG. 3.

With reference to FIG. 6A, the first device 610, which may be an access point (PCP/AP) or potentially a DMG STA, transmits a first management frame 620. Included in the first management frame is a first authentication information element 621, possibly along with a flag bit indicating that the authentication procedure is available for use. In the illustrated embodiment, the first authentication information element includes a first Nonce 622, possibly along with other information.

The first management frame 620, including the first authentication information element 621, is received by a second device 615, which may be a DMG STA or potentially an access point (PCP/AP). Subsequently, the second device constructs 625 a Pairwise Transient Key (PTK) based on information including the received first Nonce, a second Nonce generated by the DMG STA, and a pre-shared key, the index value of which may be known a priori or communicated via authentication information elements.

Additionally, the second device prepares and transmits a second management frame 630. Included in the second management frame, for example appended thereto, is a second authentication information element 631. The second authentication information element includes the second Nonce 632, as generated by the second device, as well as a Message Integrity Check (MIC) value 633 generated for the second authentication information element, viewed as a message.

Following receipt of the second Nonce by the first device, the first device constructs 635 the PTK based on information including the first Nonce, the received second Nonce, and the pre-shared key. The MIC received in the second management frame is also validated.

The first device prepares and transmits a third management frame 640. Included in the third management frame is a third authentication information element 641. The third authentication information element 641 includes a further Message Integrity Check (MIC) value 343. The further MIC value 343 is generated based on content of the third authentication information element, viewed as a message being input to the corresponding MIC hash function, potentially along with a shared secret key.

Subsequently, following receipt of the third authentication information element by the second device, the second device compares the MIC included in the third authentication information element to a corresponding further MIC generated by the second device based on the received authentication information element. The generated and received copies of the MIC can be compared to determine whether they match. If a match exists, the DMG STA may deem authentication to be established. The first and second devices may deem authentication and association to be established following successful completion of the messaging and MIC verification as described above.

FIG. 6A illustrates an optional acknowledgement message 649, analogous to that of the PBSS four-way handshake, which may be included in some embodiments of the present invention, for example for key confirmation purposes. This acknowledgement message 649 may be transmitted within a designated acknowledgment field of a fourth authentication information element 647, for example as provided in a fourth management frame 645 transmitted from the second device to the first device.

Figure 6B:
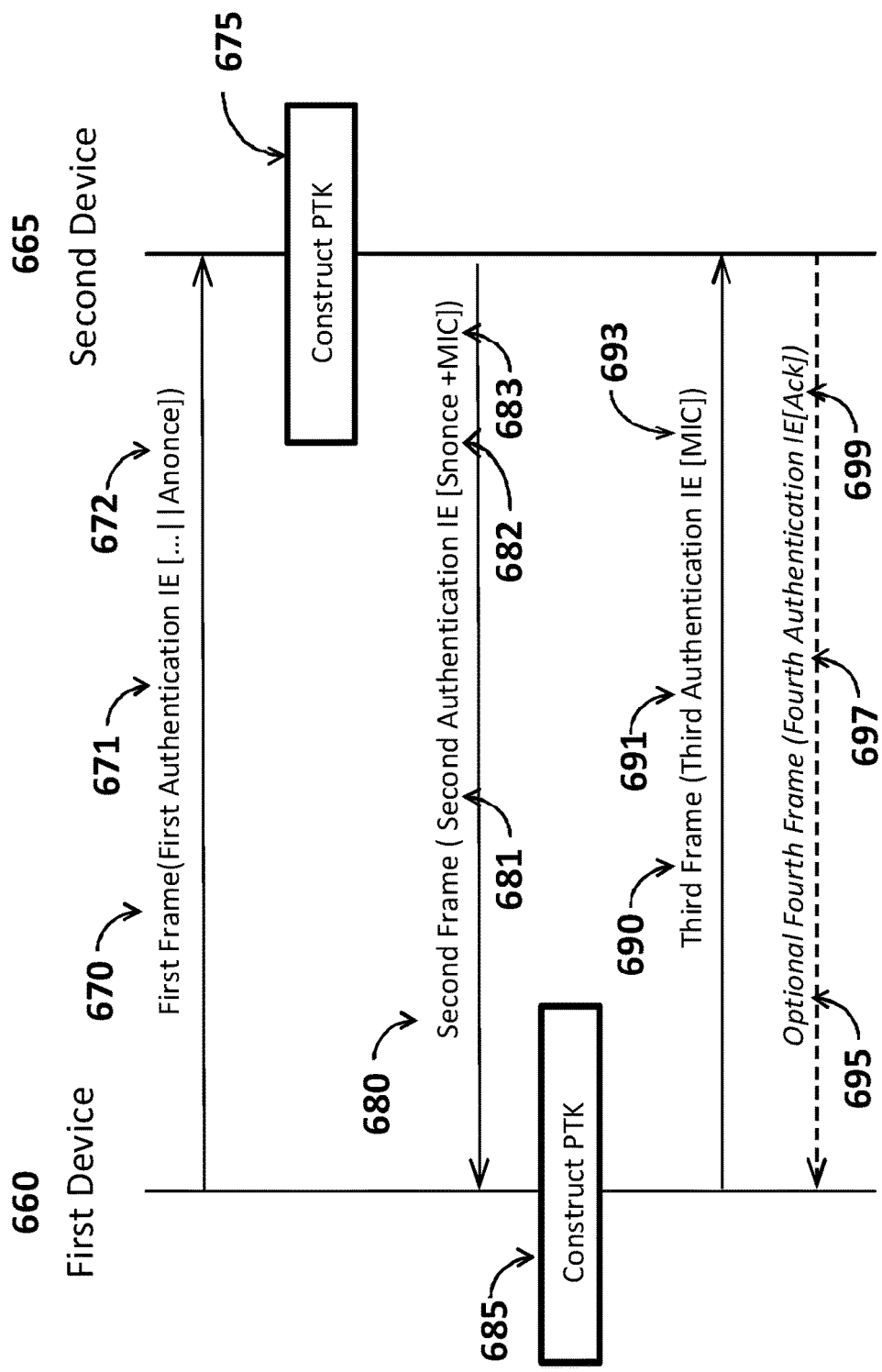
FIG. 6B illustrates a diagram showing an authentication/association process, in accordance with other embodiments of the present invention.

FIG. 6B illustrates an authentication procedure for use in an IEEE 802.11-compliant network in accordance with yet another embodiment of the present invention. In contrast with the embodiments illustrated in FIGS. 3 to 6, the authentication procedure does not necessarily use management frames. Rather, the authentication procedure can be performed using other types of frames, such as data frames, or a combination of data frames and management frames. The states of the authentication state machine as described in FIGS. 2 to 5 are not explicitly referenced in FIG. 6B, however, in various embodiments they may be included in the same manner as is illustrated in FIGS. 3 to 5. Furthermore, in some embodiments, the authentication information elements illustrated in FIG. 6B may include indications of pre-shared keys in a Key ID field, in a manner that is similar to the embodiments described with respect to FIGS. 4 and 5. Yet further, the frames illustrated in FIG. 6B may potentially be interspersed with other frames which are not illustrated. Where omitted, details of operations described with respect to FIG. 6B may proceed similarly to those described in FIG. 3.

With reference to FIG. 6B, the first device 660, which may be an access point (PCP/AP) or potentially a DMG STA, transmits a first frame 670. Included in the first frame is a first authentication information element 671, possibly along with a flag bit indicating that the authentication procedure is available for use. In the illustrated embodiment, the first authentication information element includes a first Nonce 672, possibly along with other information.

The first frame 670, including the first authentication information element 671, is received by a second device 665, which may be a DMG STA or potentially an access point (PCP/AP). Subsequently, the second device constructs 675 a Pairwise Transient Key (PTK) based on information including the received first Nonce, a second Nonce generated by the DMG STA, and a pre-shared key, the index value of which may be known a priori or communicated via authentication information elements.

Additionally, the second device prepares and transmits a second frame 680. Included in the second frame, for example appended thereto, is a second authentication information element 681. The second authentication information element includes the second Nonce 682, as generated by the second device, as well as a Message Integrity Check (MIC) value 683 generated for the second authentication information element, viewed as a message.

Following receipt of the second Nonce by the first device, the first device constructs 685 the PTK based on information including the first Nonce, the received second Nonce, and the pre-shared key. The MIC received in the second frame is also validated.

The first device prepares and transmits a third frame 690. Included in the third frame is a third authentication information element 691. The third authentication information element 691 includes a further Message Integrity Check (MIC) value 343. The further MIC value 343 is generated based on content of the third authentication information element, viewed as a message being input to the corresponding MIC hash function, potentially along with a shared secret key.

Subsequently, following receipt of the third authentication information element by the second device, the second device compares the MIC included in the third authentication information element to a corresponding further MIC generated by the second device based on the received authentication information element. The generated and received copies of the MIC can be compared to determine whether they match. If a match exists, the DMG STA may deem authentication to be established. The first and second devices may deem authentication and association to be established following successful completion of the messaging and MIC verification as described above.

FIG. 6B illustrates an optional acknowledgement message 699, analogous to that of the PBSS four-way handshake, which may be included in some embodiments of the present invention, for example for key confirmation purposes. This acknowledgement message 699 may be transmitted within a designated acknowledgment field of a fourth authentication information element 697, for example as provided in a fourth frame 695 transmitted from the second device to the first device.

Embodiments of the present invention provide for an authentication information element having one or more data fields which carry data for use in the authentication procedure. In various embodiments, the content of the data fields is interpreted in a context-dependent manner. For example, the content of a given data field can be interpreted as a different parameter when it is included in a frame transmitted in the uplink direction than when it is included in a frame transmitted in the downlink direction. As another example, the content of a given data field can be interpreted as a different parameter when the authentication state machine for example of FIG. 1 is in a first state than when the authentication state machine is in a second, different state. As another example, the content of a given data field can be interpreted as a different parameter depending upon which part of the four-way handshake is being carried out. The authentication information element is interpreted in accordance with the bit settings thereof, and predetermined operational rules, such as those operational rules described below.

Figure 7:
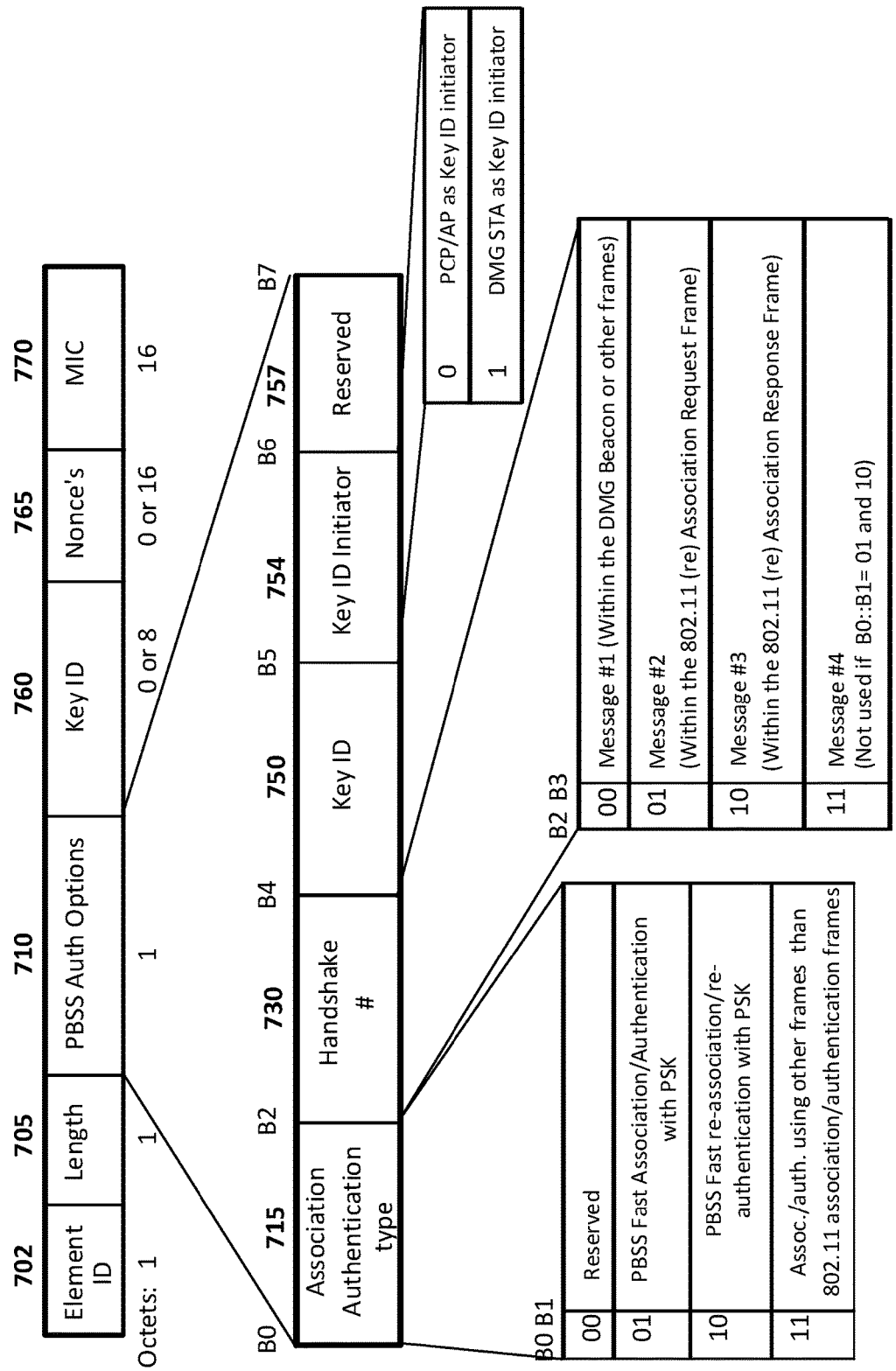
FIG. 7 illustrates an authentication information element format provided in accordance with embodiments of the present invention.

FIG. 7 illustrates an authentication information element format provided in accordance with embodiments of the present invention. The formatting details of the illustrated authentication information element are provided as one possibility. Other formats can be used in embodiments of the present invention, for example by adjusting or adapting the illustrated format. The illustrated format can be customized to carry different combinations of information. As such, the same format can be used for the first, second or third handshake message of the abbreviated handshake version of the PBSS four-way handshake. In various embodiments, the same format can also be used for the fourth handshake message of the full version of the PBSS four-way handshake. Formatting details described in the present example and which can be varied include the ordering of data fields and sub-fields, and the bit values used to indicate different content of these data fields and sub-fields. For example, when a particular binary value (indicative of a single bit) or bit value (indicative of multiple bits) is specified below, it should be understood that this bit value is an example only, and can be adjusted.

According to embodiments of the present invention, a common template structure for the authentication information element format is provided which specifies a plurality of potential data fields and a plurality of potential lengths of at least one of the potential data fields. Each authentication information element can be configured by selecting a particular format which is allowed and specified under the template structure, based on current requirements.

As illustrated, the authentication information element includes an Element ID field 702, for example of length 1 Octet. The Element ID field indicates that the information element is an authentication information element. The authentication information element includes a Length field 705, for example of length 1 Octet. The Length field indicates the overall length of the authentication information element.

The authentication information element includes an Options field 710, for example of length 1 Octet. The Options field includes a two-bit Type sub-field 715, a two-bit Handshake sub-field 730, a one-bit Key ID usage flag 750, a one-bit Key ID initiator indicator bit 754, and a section of one or more reserved bits 757.

The Type sub-field 715 indicates whether the authentication information element is associated with an authentication and association process using a pre-shared key (bit value 01), or whether the authentication information element is associated with a re-authentication and re-association process using a pre-shared key (bit value 10), or whether the authentication information element is associated with an authentication (and optionally association) process using frames other than IEEE 802.11 association and/or authentication frames (bit value 11). For example, the authentication information element can be carried in a data frame.

The Handshake sub-field 730 indicates which sequential message of the PBSS four-way handshake or abbreviated handshake is being conveyed by the authentication information element. A bit value of 00 indicates that the first handshake message is being conveyed (for example via a DMG Beacon frame), a bit value of 01 indicates that the second handshake message is being conveyed (for example via an association request or re-association request frame), a bit value of 10 indicates that the third handshake message is being conveyed (for example via an association or re-association response frame), and a bit value of 11 indicates that the optional fourth handshake message is being conveyed (unused if the Type sub-field contains a bit value of 01 or 10). The content of the authentication information element, including the length of variable-length fields, as well as the application of content of fields such as the Nonce field, can be inferred based at least in part on the value in the Handshake sub-field.

The Key ID usage flag 750 indicates whether the Key ID field 760 is present or absent.

The Key ID initiator bit 754 indicates which entity initiates communication of the Key ID. If the Key ID initiator bit is set to zero, then the access point (PCP/AP) is identified as the entity initiating communication of the Key ID. If the Key ID initiator bit is set to one, then the DMG STA is identified as the entity initiating communication of the Key ID.

The authentication information element also includes a Key ID field 760, for example of length 0 Octets (absent) or 8 Octets (present). The length is variable and can depend on the requirements of the authentication information element. When present, the Key ID field includes the Key ID value which acts as an index to a pre-shared key to be used in the authentication procedure.

The authentication information element also includes a Nonce field 765, for example of length 0 Octets or 16 Octets. The length is variable and can depend on the requirements of the authentication information element. When present, the Nonce field includes a Nonce value to be communicated, such as SNonce or ANonce.

The authentication information element also includes a Message Integrity Check (MIC) field 770, for example of length 16 Octets. The MIC field includes a current MIC value for use in performing message integrity checking in the authentication procedure.

In embodiments of the present invention, the first authentication information element, the second authentication information element, and the third authentication information element of a procedure described above, for example with respect to FIG. 3, FIG. 6A or FIG. 6B, are formatted as follows, with reference to FIG. 7. The first authentication information element 321 or 621 includes a bit value of 00 in the Handshake sub-field 730, and the Nonce field 765 carries the first Nonce 322 or 622. The second authentication information element 331 or 631 includes a bit value of 01 in the Handshake sub-field 730, the Nonce field 765 carries the second Nonce 332 or 632 and the MIC field 770 carries the MIC 333 or 633. The third authentication information element 341 or 641 includes a bit value of 10 in the Handshake sub-field 730, and the MIC field 770 carries the MIC 343 or 643.

Upon receipt, a frame containing an authentication information element can be handled in accordance with various operational rules. The operational rules allow appropriate handling of the frame in order to facilitate authentication in various embodiments. As an example, various operational rules according to an embodiment of the present invention are described below. Additional rules can be added, or rules can be modified as appropriate.

If the Type sub-field contains a bit value of 01, and if the Handshake sub-field contains a bit value of 00, then the Nonce field is determined to be 16 octets long and is interpreted as carrying the ANonce.

If the Type sub-field contains a bit value of 01, and if the Handshake sub-field contains a bit value of 01, then the Nonce field is determined to be 16 octets long and is interpreted as carrying the SNonce.

If the Type sub-field contains a bit value of 01, and if the Handshake sub-field contains a bit value of 10, then the Nonce field is determined to be 0 octets long.

If the Type sub-field contains a bit value of 10, and if the Handshake sub-field contains a bit value of 00, then the Nonce field is determined to be 16 octets long and is interpreted as carrying the ANonce.

If the Type sub-field contains a value of 10, and if the Handshake sub-field contains a value of 01, then the Nonce field is determined to be 16 octets long and is interpreted as carrying the SNonce.

If the Type sub-field contains a bit value of 10, and if the Handshake sub-field contains a bit value of 10, then the Nonce field is determined to be 0 octets long.

If the Type sub-field contains a bit value of 11, and if the Handshake sub-field contains a bit value of 00, then the Nonce field is determined to be 16 octets long and is interpreted as carrying the ANonce.

If the Type sub-field contains a bit value of 11, and if the Handshake sub-field contains a bit value of 01, then the Nonce field is determined to be 16 octets long and is interpreted as carrying the SNonce.

If the Type sub-field contains a bit value of 11, and if the Handshake sub-field contains a bit value of 10, then the Nonce field is determined to be 0 octets long.

If the Type sub-field contains a bit value of 11, and if the Handshake sub-field contains a bit value of 11, then the Nonce field is determined to be 0 octets long.

If the Key ID usage flag contains a binary value of 0, then the Key ID field is determined to be 0 octets long.

If the Key ID usage flag contains a binary value of 1, then the Key ID field is determined to be 8 octets long.

If the Handshake sub-field contains a bit value of 00, then the MIC field is determined to be 0 octets long. Otherwise, the MIC field is determined to be 16 octets long.

FIG. 8 illustrates truth tables encoding various operational rules as described above. The operational rules relating to the Key ID field length depending solely on the value of the Key ID usage flag are not illustrated.

FIG. 9 illustrates a chart related to a proposed authentication key management suite for use in the in-development IEEE 802.11ay standard, according to an embodiment of the present invention.

Figure 10:
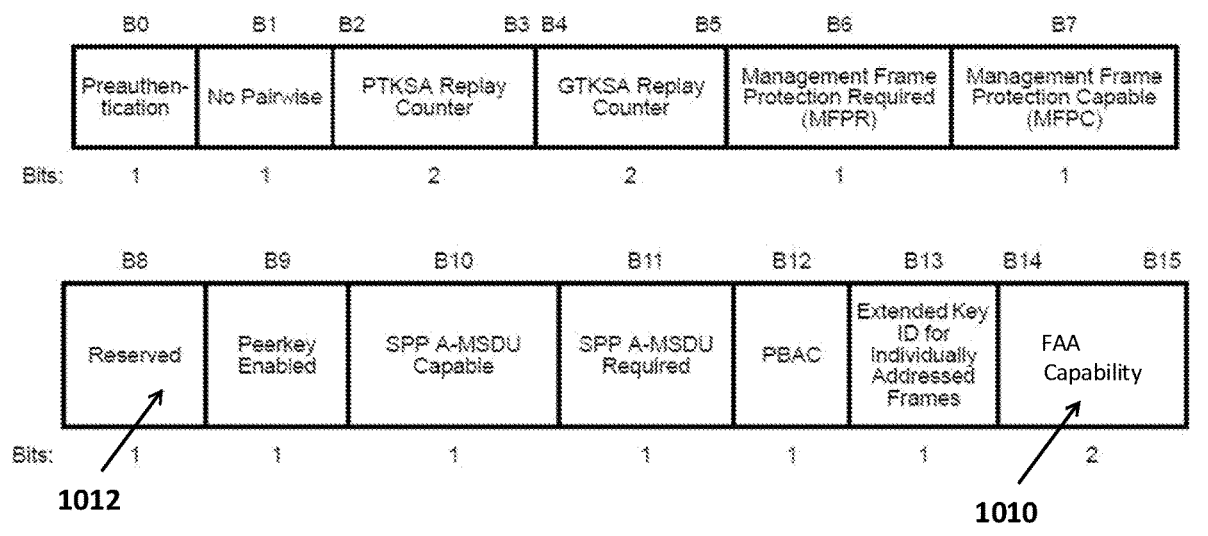

FIG. 10 illustrates a Robust Security Network (RSN) capability field, according to an embodiment of the present invention. The standard IEEE 802.11 RSN indicator as described in Subclause 8.4.2.24.4 of the standard is updated so that a reserved bit at the end of the indicator is re-defined as an "FAA Capability" indicator bit 1010. Alternatively the reserved bit at location 1012 can be re-defined as the "FAA Capability" indicator bit. Setting the FAA Capability bit to binary zero indicates that the Fast Authentication/Association procedure as described herein (using authentication information elements appended to management frames) is not being used. Setting the FAA Capability bit to binary one indicates that the Fast Authentication/Association procedure as described herein (using authentication information elements appended to management frames) is being used, and an authentication information element is attached thereafter.

Figure 11:
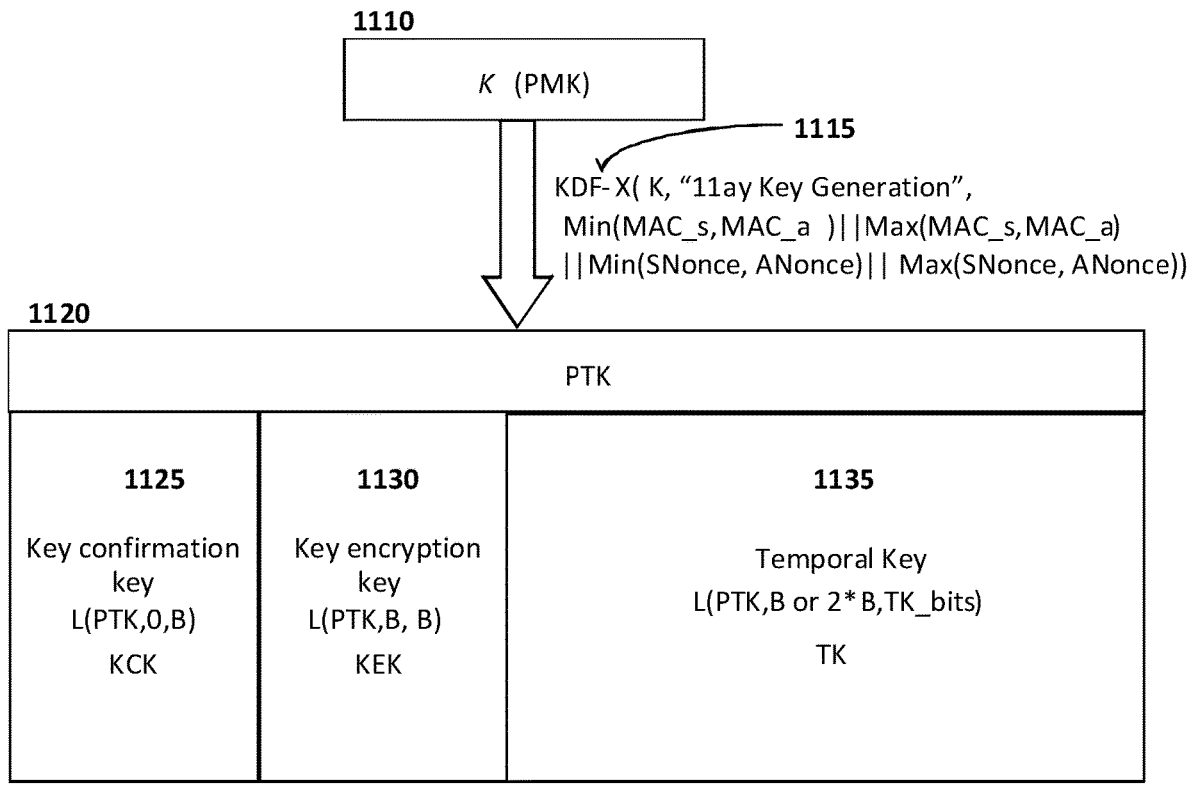
FIG. 11 illustrates an encryption key hierarchy provided in accordance with an embodiment of the present invention.

FIG. 11 illustrates a key hierarchy provided in accordance with an embodiment of the present invention, particularly in absence of a key identifier as described above. A pre-shared key K 1110, which may correspond to the Pairwise Master Key (PMK), is illustrated. The Pairwise Transient Key (PTK) 1120 is generated using a Key Derivation Function KDF-X 1115 based on the pre-shared key K along with other mutually known information such as common text strings, MAC addresses, and exchanged Nonces. The value "X" in KDF-X refers to the output bit length of the key derivation function. In FIG. 11, MAC_s and MAC_a represent the 48-bit MAC addresses for the DMG STA and the access point (PCP/AP), respectively, whereas SNonce and ANonce may be exchanged as described above, for example with respect to FIG. 3.

As illustrated in FIG. 11, where "Min" and "Max" represent minimum and maximum functions, respectively, the key derivation function KDF-X 1115 may correspond to the following function of pre-shared key K, fixed string "11ay Key Generation", MAC addresses MAC_s and MAC_a, and Nonces SNonce and ANonce:

KDF-X(K, "11ay Key Generation", Min(MAC_s, MAC_a)||Max(MAC_s, MAC_a)||Min(SNonce, ANonce)||Max(SNonce, ANonce)).

The Key Derivation Function KDF-X may be implemented as specified in Subclause 11.6.1.7.2 of the IEEE 802.11 standard.

The PTK 1120 may include a Key Confirmation Key (KCK) 1125, a Key Encryption Key (KEK) 1130, and a Temporal Key (TK) 1135. The KCK may be derived according to the function L(PTK, 0, B), where B at least 128 bits. The KEK may be derived according to the function L(PTK, B, B). The TK may be derived according to the function L(PTK, B or 2*B, TK bits), where TK bits is a predetermined value. The function L(a,x,y) represents the "left" function which returns the most significant bits of input "a," treating the left-most bit as bit "x", and truncating to a length of y bits.

Figure 12:
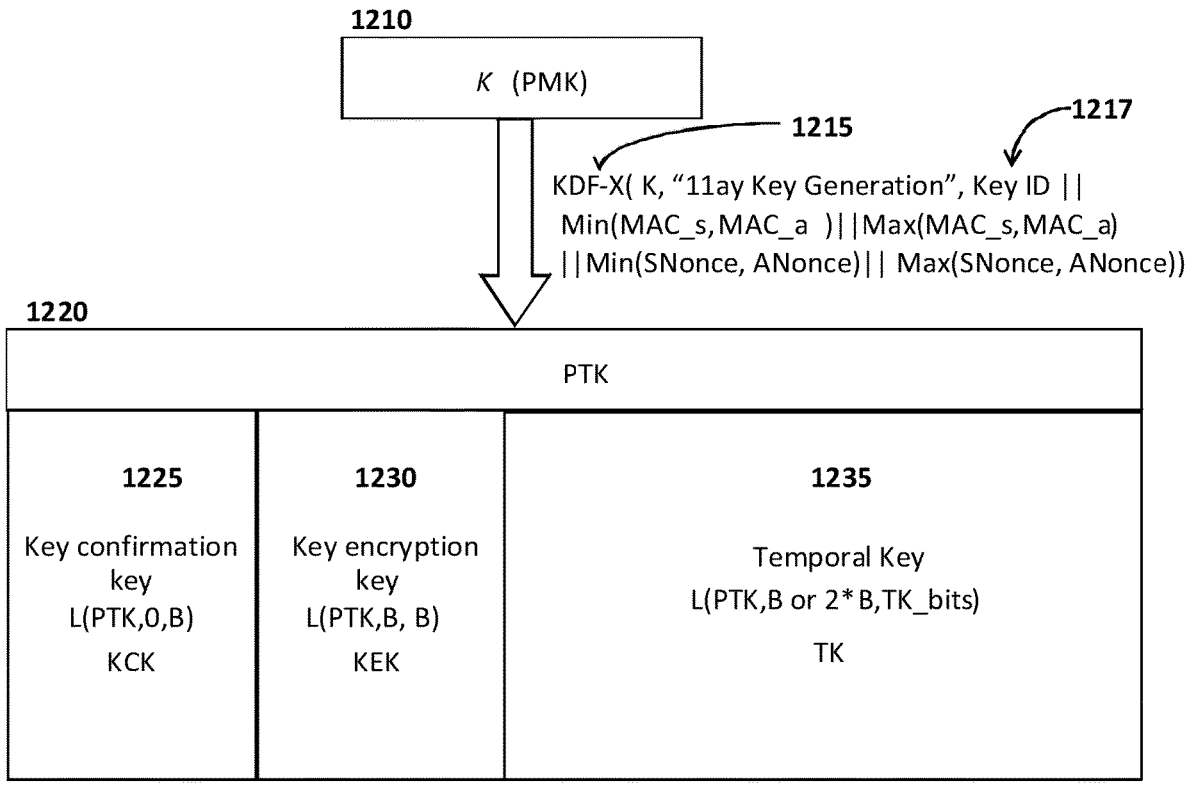
FIG. 12 illustrates an encryption key hierarchy provided in accordance with another embodiment of the present invention.

FIG. 12 illustrates a key hierarchy provided in accordance with an embodiment of the present invention, for example in presence of a key identifier Key ID as described above. The key hierarchy of FIG. 12 is comparable to that of FIG. 11, except that the key derivation function 1215 is also a function of Key ID 1217.

As illustrated in FIG. 12, the key derivation function KDF-X 1220 may correspond to the following function of pre-shared key K, fixed string such as "11ay Key Generation", the Key ID, MAC addresses MAC_s and MAC_a, and Nonces SNonce and ANonce:

KDF-X(K, "11ay Key Generation", Key ID||Min(MAC_s, MAC_a)||Max(MAC_s, MAC_a)||Min(SNonce, ANonce)||Max(SNonce, ANonce)).

Alternatively, a different fixed string such as "1 1ad Key Generation" or "Key Generation," or another arbitrary fixed string, can be used.

In various embodiments, for example as indicated above, the pre-shared key K 1210 is used to derive the PTK 1220, including the KCK 1225, KEK 1230 and TK 1235. Each of the KCK, KEK and TK may be at least 128 bits.

In various embodiments, and similarly to the IEEE 802.11ad standard, the Cipher Suites used for key management may correspond to GCMP (OUI:00-0E-AC:8).

In various embodiments, the key identifier is provided to accommodate scenarios where a trusted third party server is unavailable, and both devices are in close proximity, such that a potential threat due to eavesdropping or a man-in-the-middle attack is mitigated.

In some embodiments, key management follows Pairwise Transient Key Security Association (PTKSA) lifecycle management requirements, for example as set forth in Section 10.3.5 of the IEEE 802.11ad standard.

In some embodiments, an IEEE 802.11 re-association operation may repeat the above-described protocol for concurrent authentication/association protocol in order to resume upper layer sessions without breakout. Because re-association frames are separate frames from 802.11 association frames, embodiments of the present invention may use the same authentication information element appendix for 802.11 re-association frames as for 802.11 association frames.

Figure 13:
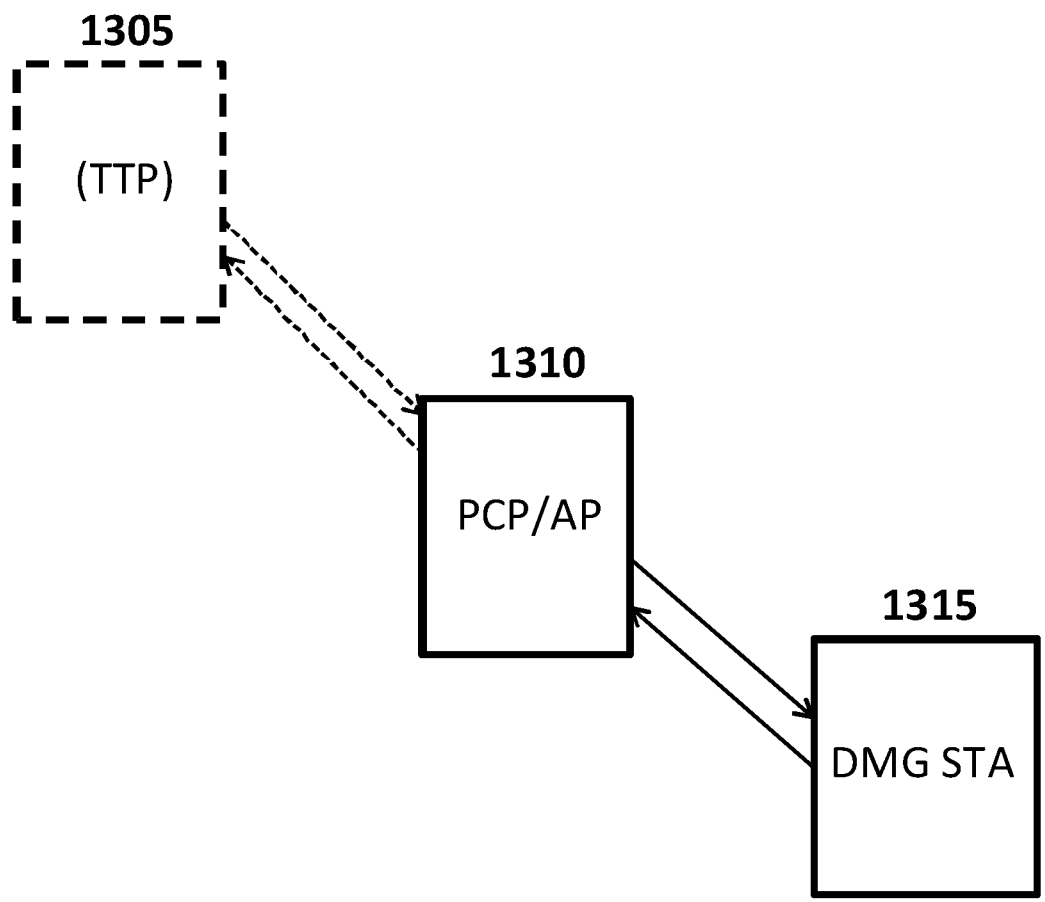
FIG. 13 illustrates an access point in communication with a device, in accordance with an embodiment of the present invention.

FIG. 13 illustrates an access point (PCP/AP) 1310 in communication with a device DMG STA 1315 over a directional multi gigabit wireless link. Association and authentication operations may be performed between the access point and the device as described herein. A trusted third party (TTP) authentication server 1305 may optionally be employed to facilitate authentication in some embodiments. However, in other embodiments, the TTP authentication server is omitted.

Figure 14:
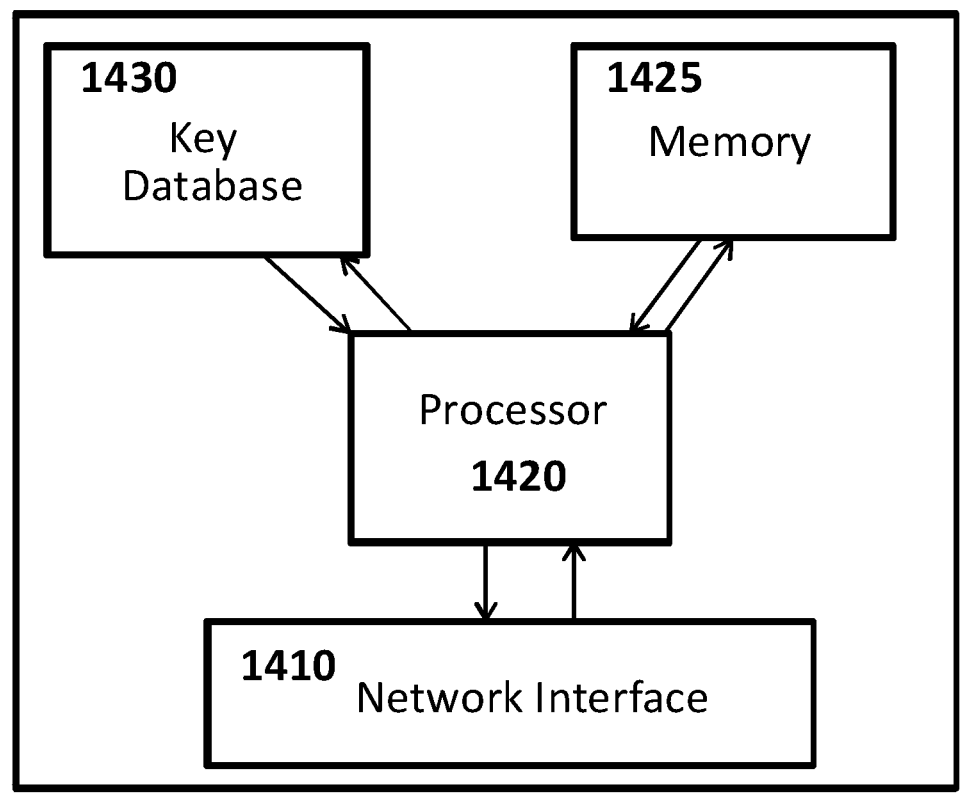
FIG. 14 illustrates a structural block diagram of an access point or device, in accordance with an embodiment of the present invention.

FIG. 14 illustrates a device, such as a wireless device (DMG STA) or access point (PCP/AP), in accordance with embodiments of the present invention. The device includes a wireless network interface 1410, for example capable of two-way communication via a directional multi gigabit wireless communication link in accordance with an appropriate version of the IEEE 802.11 standard, such as the IEEE 802.11ad or IEEE 802.11ay standard. The device further includes a processor 1420 connected to the network interface and to memory 1425. The memory may include program instructions for execution by the processor in order to facilitate communication, including association and authentication operations as described herein. The device may further include a key database 1430 configured to hold one or more pre-shared keys for selection and use as described herein. Although shown separately for clarity, the key database may be integrated with the memory. Alternatively, the key or set of keys may be held in another memory location, or set of memory locations. The device may additionally include conventional types of components of an IEEE 802.11 access point/control point or directional multi gigabit wireless device as would be readily understood by a worker skilled in the art. The device may be, for example, a handheld device, smart phone personal computing device, wireless router, or a wireless module of a device such as a vehicle or appliance.

Figure 15:
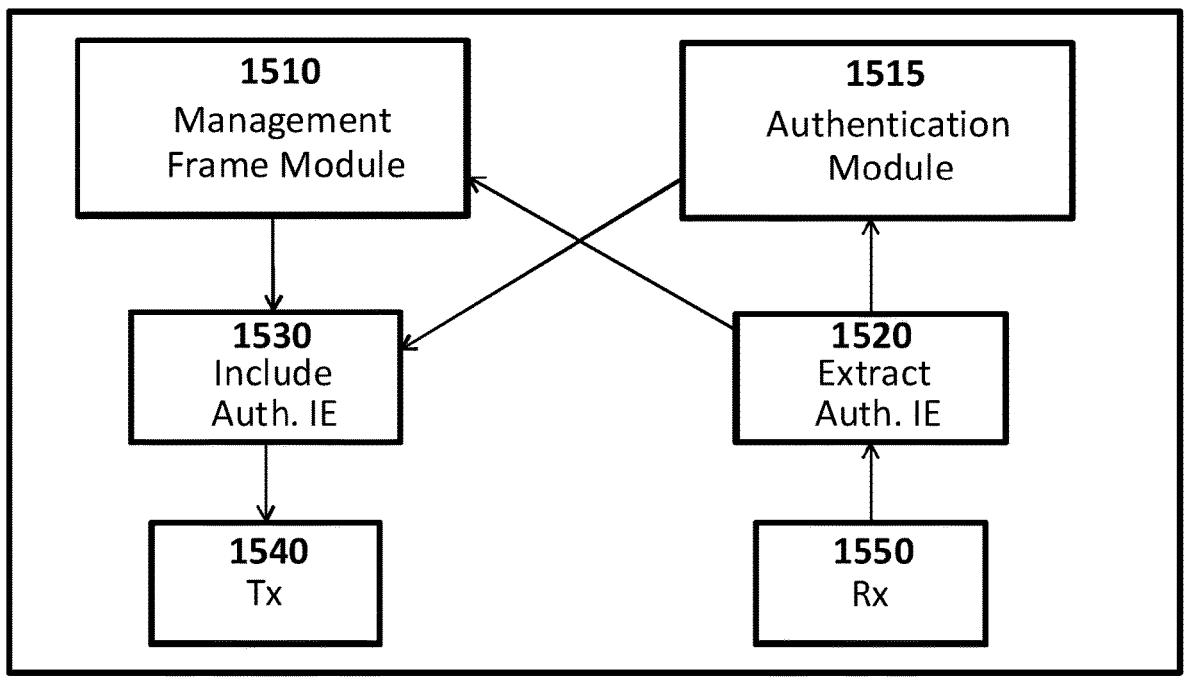
FIG. 15 illustrates a functional block diagram of an access point or device, in accordance with an embodiment of the present invention.

FIG. 15 illustrates a functional representation of the device of FIG. 14, in accordance with embodiments of the present invention. The device includes a management frame module 1510 which is configured to manage transmission and/or reception of management frames to and/or from the device. In some embodiments, the management frame module may configure the management frames so as to carry out a network association procedure. For example, when the device is a DMG STA, the management frame module may transmit an 802.11 association request frame in response to a received DMG beacon frame, and further receive an 802.11 association response frame, thereby facilitating association of the device to the IEEE 802.11 network. When the device is an access point (PCP/AP), the management frame module may transmit the DMG beacon, receive an 802.11 association request in response to the DMG beacon, and further transmit an 802.11 association response frame, thereby facilitating association of another device to the IEEE 802.11 network. More generally, the management frame module may generate and configure management frames for a variety of purposes, including but not limited to network association.

The device of FIG. 15 further includes an authentication module 1515, which is configured to receive additional authentication information elements from received management frames, and to provide additional authentication information elements for inclusion in transmitted management frames. The authentication information elements may be included in management frames and configured as described above. For example, when the device is a DMG STA, the authentication module may receive a first Nonce value ANonce from a received DMG beacon frame, construct a PTK, and provide a second Nonce value SNonce along with an MIC for inclusion in an 802.11 association request frame to be transmitted in response to the received DMG beacon frame. The authentication module may further receive a MIC included in an 802.11 association response frame. The authentication module may further verify authentication by inspection of the received MIC. When the device is an access point (PCP/AP), the authentication module may provide the first Nonce value ANonce for inclusion in a DMG beacon frame to be transmitted, receive a second Nonce value SNonce along with an MIC included in an 802.11 association request frame transmitted in response to the DMG beacon frame, and construct a PTK. The authentication module may further provide a MIC for inclusion in an 802.11 association response frame. The authentication module may further verify authentication by inspection of the received MIC.

The authentication module and the management frame module may operate at least partially in a parallelized or multi-threaded manner. Authentication information elements provided to and/or received from the authentication module may be piggybacked on frames which are provided to and/or received from the management frame module. The authentication module and management frame module may be realized via a processor or set of processors executing instructions stored in memory.

FIG. 15 further illustrates an extraction module 1520 which extracts authentication information elements from received management frames and provides these information elements to the authentication module, while forwarding the received management frames (possibly with the authentication information elements deleted), to the management frame module.

FIG. 15 further illustrates an inclusion module 1530 which includes (e.g. appends) authentication information elements provided by the authentication module to management frames provided by the management frame module.

FIG. 15 further illustrates transmission (Tx) 1540 and reception (Rx) 1550 functional modules of the network interface, which are configured to wirelessly transmit and receive at least the management frames.

Figure 16:
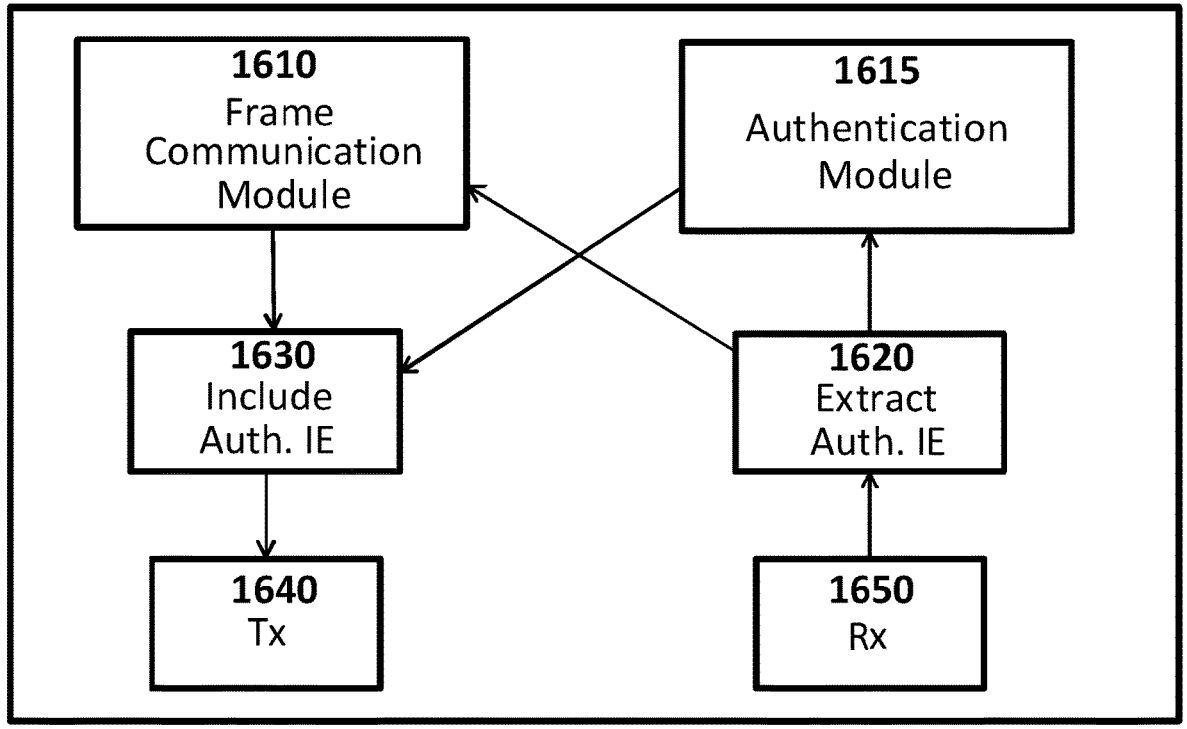
FIG. 16 illustrates a functional block diagram of an access point or device, in accordance with another embodiment of the present invention.

FIG. 16 illustrates a functional representation of the device of FIG. 14, in accordance with other embodiments of the present invention, in particular wherein communication of authentication information elements is not restricted to management frames. The device includes a frame communication module 1610 which is configured to manage transmission and/or reception of frames, such as data frames and management frames to and/or from the device. In some embodiments, the frame communication module may configure the management frames so as to carry out a network association procedure, as described with respect to FIG. 15. The frame communication module may generate and configure management frames for a variety of purposes, including but not limited to network association. The frame communication module may also handle other frames such as data frames.

The device of FIG. 16 further includes an authentication module 1615, which is configured to receive additional authentication information elements from received frames, and to provide additional authentication information elements for inclusion in transmitted frames. The authentication information elements may be included in frames and configured as described above. For example, when the device is a DMG STA, the authentication module may receive a first Nonce value ANonce from a first received frame, construct a PTK, and provide a second Nonce value SNonce along with an MIC for inclusion in a second frame to be transmitted. The authentication module may further receive a MIC included in a third received frame. The authentication module may further verify authentication by inspection of the received MIC. When the device is an access point (PCP/AP), the authentication module may provide the first Nonce value ANonce for inclusion in a first frame to be transmitted, receive a second Nonce value SNonce along with an MIC included in a second frame to be transmitted, and construct a PTK. The authentication module may further provide a MIC for inclusion in a third frame. The authentication module may further verify authentication by inspection of the received MIC.

The authentication module and the frame communication module may operate at least partially in a parallelized or multi-threaded manner. Authentication information elements provided to and/or received from the authentication module may be piggybacked on frames which are provided to and/or received from the frame communication module. The authentication module and frame communication module may be realized via a processor or set of processors executing instructions stored in memory.

FIG. 16 further illustrates an extraction module 1620 which extracts authentication information elements from received frames and provides these information elements to the authentication module, while forwarding the received frames (possibly with the authentication information elements deleted), to the frame communication module.

FIG. 16 further illustrates an inclusion module 1630 which includes (e.g. appends) authentication information elements provided by the authentication module to frames provided by the frame communication module.

FIG. 16 further illustrates transmission (Tx) 1640 and reception (Rx) 1650 functional modules of the network interface, which are configured to wirelessly transmit and receive at least the management frames.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for authenticating a Directional Multigigabit (DMG or EDMG) Station (STA) (DMG or EDMG STA) device for communication in an IEEE 802.11-compliant wireless network, the DMG or EDMG STA device accessing the network via wireless communication with an access point, the method comprising:
including one or more authentication information elements in one or more respective IEEE 802.11 frames transmitted between the access point and the device in a bidirectional exchange involving multiple messages, the one or more authentication information elements including data for use in an authentication handshake procedure involving the multiple messages and for establishing that both the access point and the device possess a common cryptographic key, wherein the one or more respective IEEE 802.11 frames include one or more of: a beacon frame, an association request frame, and an association response frame, and
wherein the data includes: a Nonce for use in the authentication handshake procedure; and a Message Integrity Check value for use in the authentication handshake procedure.

2. The method of claim 1, wherein the one or more authentication information elements are included in frames transmitted from the access point to the device.

3. The method of claim 2, further comprising receiving one or more further authentication information elements included in one or more further frames received by the access point from the device, the authentication handshake procedure based on exchange of the one or more authentication information elements and the one or more further authentication information elements.

4. The method of claim 1, wherein the one or more authentication information elements are included in frames transmitted from the device to the access point.

5. The method of claim 4, further comprising receiving one or more further authentication information elements included in one or more further frames received by the device from the access point, the authentication handshake procedure based on exchange of the one or more authentication information elements and the one or more further authentication information elements.

6. The method of claim 1, wherein at least some of the management frames are used to perform a network access procedure or a network association procedure in parallel with the authentication handshake procedure.

7. The method of claim 1, wherein the data includes a key identifier indicative of which key of a plurality of pre-shared keys is to be used in the authentication handshake procedure.

8. The method of claim 1, wherein the authentication handshake procedure comprises:
transmitting a first authentication information element from the access point to the device, the first authentication information element including a first Nonce value;
subsequently transmitting a second authentication information element from the device to the access point, the second authentication information element including a second Nonce value and a Message Integrity Check value; and
subsequently transmitting a third authentication information element from the access point to the device, the third authentication information element including a further Message Integrity Check value,
wherein said authentication information elements include either: the first authentication information element and the third authentication information element; or the second authentication information element.

9. The method of claim 8, wherein the first authentication information element is included in a first management frame being: a Beacon frame; an Announcement frame; or a Probe Response frame, the second authentication information element is included in a second management frame being: an Association Request frame; or a Re-Association Request frame, and the third authentication information element is included in a third management frame being: an Association Response frame; or a Re-Association Response frame.

10. A method for authenticating a Directional Multigigabit (DMG or EDMG) Station (STA) (DMG or EDMG STA) device for communication in an IEEE 802.11-compliant wireless network, the DMG or EDMG STA device accessing the network via wireless communication with an access point, the method comprising:
including one or more authentication information elements in one or more respective IEEE 802.11 frames transmitted between the access point and the device in a bidirectional exchange involving multiple messages, the one or more authentication information elements including data for use in an authentication handshake procedure involving the multiple messages and for establishing that both the access point and the device possess a common cryptographic key,
wherein the data includes: a Nonce for use in the authentication handshake procedure; and a Message Integrity Check value for use in the authentication handshake procedure, and
wherein the IEEE 802.11 frames include management frames and the frames are frames other than authentication frames.

11. A method for authenticating a Directional Multigigabit (DMG or EDMG) Station (STA) (DMG or EDMG STA) device for communication in an IEEE 802.11-compliant wireless network, the DMG or EDMG STA device accessing the network via wireless communication with an access point, the method comprising:
including one or more authentication information elements in one or more respective IEEE 802.11 frames transmitted between the access point and the device in a bidirectional exchange involving multiple messages, the one or more authentication information elements including data for use in an authentication handshake procedure involving the multiple messages and for establishing that both the access point and the device possess a common cryptographic key,
wherein the data includes: a Nonce for use in the authentication handshake procedure; and a Message Integrity Check value for use in the authentication handshake procedure, and
wherein the IEEE 802.11 frames include data frames.

12. An IEEE 802.11-compliant Directional Multigigabit (DMG or EDMG) device comprising a processor coupled to a wireless network interface and configured to:
include one or more authentication information elements in one or more respective IEEE 802.11 frames transmitted from the device to a second device via the wireless network in a bidirectional exchange involving multiple messages, the one or more authentication information elements including data for use in an authentication handshake procedure involving the multiple messages and for establishing that both the device and the second device possess a common cryptographic key, wherein the one or more respective IEEE 802.11 frames include one or more of: a beacon frame, an association request frame, and an association response frame,
wherein the data includes: a Nonce for use in the authentication handshake procedure; and a Message Integrity Check value for use in the authentication handshake procedure.

13. The device of claim 12, wherein the device is an IEEE 802.11-compliant wireless communication device and the second device is an IEEE 802.11-compliant access point, the device further configured to:
read a further authentication information element from a further frame which is transmitted by the second device and received by the device;
configure at least one of the one or more authentication information elements based at least partially on data included in the further authentication element, the one or more authentication information elements and the further authentication information element thereby used to carry out the authentication handshake procedure.

14. The device of claim 12, wherein the device is an IEEE 802.11-compliant access point and the second device is an IEEE 802.11-compliant wireless communication device, the device further configured to:
read a further authentication information element from a first further frame which is transmitted by the second device and received by the device in response to receipt of a first one of the one or more authentication information elements;
configure one of the one or more authentication information elements based at least partially on data included in the further authentication element, the one or more authentication information elements and the further authentication information element thereby used to carry out the authentication handshake procedure.

15. The device of claim 12, wherein at least some of the management frames are used to perform a network access procedure or a network association procedure in parallel with the authentication handshake procedure.

16. The device of claim 12, wherein the data includes one or more of: a key identifier indicative of which key of a plurality of pre-shared keys is to be used in the authentication handshake procedure; and a Message Integrity Code for use in the authentication handshake procedure.

17. An IEEE 802.11-compliant Directional Multigigabit (DMG or EDMG) device comprising a hardware processor coupled to a wireless network interface and configured to:
include one or more authentication information elements in one or more respective IEEE 802.11 frames transmitted from the device to a second device via the wireless network in a bidirectional exchange involving multiple messages, the one or more authentication information elements including data for use in an authentication handshake procedure involving the multiple messages and for establishing that both the device and the second device possess a common cryptographic key,
wherein the data includes: a Nonce for use in the authentication handshake procedure; and a Message Integrity Check value for use in the authentication handshake procedure, and
wherein the IEEE 802.11 frames include management frames and the frames are frames other than authentication frames.

18. An IEEE 802.11-compliant Directional Multigigabit (DMG or EDMG) device comprising a hardware processor coupled to a wireless network interface and configured to:
include one or more authentication information elements in one or more respective IEEE 802.11 frames transmitted from the device to a second device via the wireless network in a bidirectional exchange involving multiple messages, the one or more authentication information elements including data for use in an authentication handshake procedure involving the multiple messages and for establishing that both the device and the second device possess a common cryptographic key,
wherein the data includes: a Nonce for use in the authentication handshake procedure; and a Message Integrity Check value for use in the authentication handshake procedure, and
wherein the IEEE 802.11 frames include data frames.

19. An IEEE 802.11-compliant Directional Multigigabit (DMG or EDMG) device comprising a processor coupled to a wireless network interface and configured to:
generate an authentication information element comprising data for use in an authentication handshake procedure involving multiple messages in a bidirectional exchange for establishing that both the device and the second device possess a common cryptographic key, the data including a Nonce for use in the authentication handshake procedure; and a Message Integrity Check value for use in the authentication handshake procedure; and
include the authentication information element in an IEEE 802.11 beacon frame, an IEEE 802.11 association request frame, or an IEEE 802.11 association response frame to be transmitted from the device to a second device via the wireless network interface as one of said multiple messages.

20. The device of claim 19, wherein the authentication information element includes a data field, the device configured to interpret content of the data field is differently depending on one or more contextual parameters selected from the group consisting of: whether the device is a wireless communication device or an access point; a current state of an authentication state machine; and a current level of completion of a four-way handshake procedure.

21. The device of claim 19, further configured to handle one or more further authentication information elements, the one or more further authentication information elements being generated by the device, received from the second device via the wireless network interface, or both, wherein each of the authentication information element and the one or more further authentication information elements are configured based on a common template structure specifying a plurality of potential data fields and a plurality of potential lengths of at least one of the potential data fields.

22. An Enhanced Directional Multigigabit Station device configured to:

include an authentication information element in a management frame transmitted by the device during a network association procedure, the authentication information element usable in a pre-shared key based authentication and key generation handshake procedure involving multiple messages in a bidirectional exchange and operating in parallel with the network association procedure, thereby reducing time to reach an associated and authenticated state involving the device, wherein the management frame is an IEEE 802.11 beacon frame, an IEEE 802.11 association request frame, or an IEEE 802.11 association response frame, wherein the authentication information element includes: a Nonce for use in the authentication handshake procedure; and a Message Integrity Check value for use in the authentication handshake procedure.

\* \* \* \* \*